US008984857B2

(12) United States Patent
Minta et al.

(10) Patent No.: US 8,984,857 B2
(45) Date of Patent: Mar. 24, 2015

(54) LOW EMISSION POWER GENERATION AND HYDROCARBON RECOVERY SYSTEMS AND METHODS

(75) Inventors: Moses Minta, Missouri City, TX (US); Franklin F. Mittricker, Jamul, CA (US); Peter C. Rasmussen, Conroe, TX (US); Loren K. Starcher, Sugar Land, TX (US); Chad C. Rasmussen, Houston, TX (US); James T. Wilkins, Houston, TX (US); Richard W. Meidel, Jr., The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 1053 days.

(21) Appl. No.: 12/919,702

(22) PCT Filed: Mar. 25, 2009

(86) PCT No.: PCT/US2009/038247
§ 371 (c)(1),
(2), (4) Date: Aug. 26, 2010

(87) PCT Pub. No.: WO2009/120779
PCT Pub. Date: Oct. 1, 2009

(65) Prior Publication Data
US 2011/0000221 A1 Jan. 6, 2011

Related U.S. Application Data

(60) Provisional application No. 61/153,508, filed on Feb. 18, 2009, provisional application No. 61/072,292, filed on Mar. 28, 2008.

(51) Int. Cl.
*E21B 43/16* (2006.01)
*E21B 43/20* (2006.01)
(Continued)

(52) U.S. Cl.
CPC ............... *F01K 23/068* (2013.01); *Y02C 10/00* (2013.01); *Y02C 10/14* (2013.01); *Y02E 20/185* (2013.01); *Y02E 20/18* (2013.01); *Y02E 20/16* (2013.01)

USPC .... 60/39.465; 60/39.463; 60/783; 60/39.182; 60/794; 166/402

(58) Field of Classification Search
USPC ................ 60/780, 781, 39.465, 39.5, 39.511, 60/39.52, 39.182, 794, 39.463; 166/402
See application file for complete search history.

(56) References Cited

U.S. PATENT DOCUMENTS 2,488,911 A 11/1949 Hepburn et al.
2,884,758 A 5/1959 Oberle
(Continued)

FOREIGN PATENT DOCUMENTS

CA 2231749 9/1998
CA 2645450 9/2007
(Continued)

OTHER PUBLICATIONS

Ahmed, S. et al. (1998) "Catalytic Partial Oxidation Reforming of Hydrocarbon Fuels," 1998 Fuel Cell Seminar, 7 pgs.
(Continued)

*Primary Examiner* — William H Rodriguez
*Assistant Examiner* — Karthik Subramanian
(74) *Attorney, Agent, or Firm* — ExxonMobil Upstream Research Company Law Department

(57) ABSTRACT

Methods and systems for low emission power generation in hydrocarbon recovery processes are provided. One system includes integrated pressure maintenance and miscible flood systems with low emission power generation. An alternative system provides for low emission power generation, carbon sequestration, enhanced oil recovery (EOR), or carbon dioxide sales using a hot gas expander and external combustor. Another alternative system provides for low emission power generation using a gas power turbine to compress air in the inlet compressor and generate power using hot carbon dioxide laden gas in the expander. Other efficiencies may be gained by incorporating heat cross-exchange, a desalination plant, co-generation, and other features.

39 Claims, 11 Drawing Sheets

(51) Int. Cl.
  *E21B 43/24*   (2006.01)
  *F02C 3/20*    (2006.01)
  *F02G 5/00*    (2006.01)
  *F02C 6/18*    (2006.01)
  *F02C 6/04*    (2006.01)
  *F01K 23/06*   (2006.01)

(56) References Cited

U.S. PATENT DOCUMENTS

| | | | |
|---|---|---|---|
| 3,147,805 A * | 9/1964 | Goodwin et al. | 166/288 |
| 3,292,701 A * | 12/1966 | Goodwin et al. | 166/281 |
| 3,631,672 A | 1/1972 | Gentile et al. | |
| 3,643,430 A | 2/1972 | Emory et al. | |
| 3,705,492 A | 12/1972 | Vickers | |
| 3,841,382 A | 10/1974 | Gravis et al. | |
| 3,949,548 A | 4/1976 | Lockwood | |
| 4,018,046 A | 4/1977 | Hurley | |
| 4,043,395 A | 8/1977 | Every et al. | |
| 4,050,239 A | 9/1977 | Kappler et al. | |
| 4,066,214 A | 1/1978 | Johnson | |
| 4,077,206 A | 3/1978 | Ayyagari | |
| 4,085,578 A | 4/1978 | Kydd | |
| 4,092,095 A | 5/1978 | Straitz | |
| 4,101,294 A | 7/1978 | Kimura | |
| 4,112,676 A | 9/1978 | DeCorso | |
| 4,117,671 A | 10/1978 | Neal et al. | |
| 4,160,640 A | 7/1979 | Maev et al. | |
| 4,165,609 A | 8/1979 | Rudolph | |
| 4,171,349 A | 10/1979 | Cucuiat et al. | |
| 4,204,401 A | 5/1980 | Earnest | |
| 4,222,240 A | 9/1980 | Castellano | |
| 4,224,991 A | 9/1980 | Sowa et al. | |
| 4,236,378 A | 12/1980 | Vogt | |
| 4,253,301 A | 3/1981 | Vogt | |
| 4,271,664 A | 6/1981 | Earnest | |
| 4,344,486 A * | 8/1982 | Parrish | 166/272.1 |
| 4,345,426 A | 8/1982 | Egnell et al. | |
| 4,352,269 A | 10/1982 | Dineen | |
| 4,380,895 A | 4/1983 | Adkins | |
| 4,399,652 A | 8/1983 | Cole et al. | |
| 4,414,334 A | 11/1983 | Hitzman | |
| 4,434,613 A * | 3/1984 | Stahl | 60/784 |
| 4,435,153 A | 3/1984 | Hashimoto et al. | |
| 4,442,665 A | 4/1984 | Fick et al. | |
| 4,445,842 A | 5/1984 | Syska | |
| 4,479,484 A | 10/1984 | Davis | |
| 4,480,985 A | 11/1984 | Davis | |
| 4,488,865 A | 12/1984 | Davis | |
| 4,498,288 A | 2/1985 | Vogt | |
| 4,498,289 A | 2/1985 | Osgerby | |
| 4,528,811 A | 7/1985 | Stahl | |
| 4,543,784 A | 10/1985 | Kirker | |
| 4,548,034 A | 10/1985 | Maguire | |
| 4,548,267 A * | 10/1985 | Sheffield et al. | 166/268 |
| 4,561,245 A | 12/1985 | Ball | |
| 4,569,310 A | 2/1986 | Davis | |
| 4,577,462 A | 3/1986 | Robertson | |
| 4,578,201 A * | 3/1986 | Burns et al. | 507/225 |
| 4,602,614 A | 7/1986 | Percival et al. | |
| 4,606,721 A | 8/1986 | Livingston | |
| 4,613,299 A | 9/1986 | Backheim | |
| 4,635,721 A * | 1/1987 | Sheffield et al. | 166/268 |
| 4,637,792 A | 1/1987 | Davis | |
| 4,651,712 A | 3/1987 | Davis | |
| 4,653,278 A | 3/1987 | Vinson et al. | |
| 4,681,678 A | 7/1987 | Leaseburge et al. | |
| 4,684,465 A | 8/1987 | Leaseburge et al. | |
| 4,690,219 A * | 9/1987 | Burns et al. | 166/307 |
| 4,714,032 A * | 12/1987 | Dickinson | 110/347 |
| 4,747,858 A * | 5/1988 | Gottier | 62/632 |
| 4,753,666 A | 6/1988 | Pastor et al. | |
| 4,762,543 A | 8/1988 | Pantermuehl et al. | |
| 4,765,407 A * | 8/1988 | Yuvancic | 166/268 |
| 4,817,387 A | 4/1989 | Lashbrook | |
| 4,858,428 A | 8/1989 | Paul | |
| 4,895,710 A * | 1/1990 | Hartmann et al. | 423/351 |
| 4,898,001 A | 2/1990 | Kuroda et al. | |
| 4,899,544 A * | 2/1990 | Boyd | 60/618 |
| 4,946,597 A | 8/1990 | Sury | |
| 4,976,100 A | 12/1990 | Lee | |
| 5,014,785 A | 5/1991 | Puri et al. | |
| 5,044,932 A | 9/1991 | Martin et al. | |
| 5,050,375 A * | 9/1991 | Dickinson | 60/39.12 |
| 5,073,105 A | 12/1991 | Martin et al. | |
| 5,084,438 A | 1/1992 | Matsubara et al. | |
| 5,085,274 A | 2/1992 | Puri et al. | |
| 5,098,282 A | 3/1992 | Schwartz et al. | |
| 5,123,248 A | 6/1992 | Monty et al. | |
| 5,133,406 A * | 7/1992 | Puri | 166/266 |
| 5,135,387 A | 8/1992 | Martin et al. | |
| 5,141,049 A | 8/1992 | Larsen et al. | |
| 5,142,866 A | 9/1992 | Yanagihara et al. | |
| 5,147,111 A | 9/1992 | Montgomery | |
| 5,154,596 A | 10/1992 | Schwartz et al. | |
| 5,183,232 A | 2/1993 | Gale | |
| 5,195,884 A | 3/1993 | Schwartz et al. | |
| 5,197,289 A | 3/1993 | Glevicky et al. | |
| 5,238,395 A | 8/1993 | Schwartz et al. | |
| 5,255,506 A | 10/1993 | Wilkes et al. | |
| 5,261,225 A * | 11/1993 | Dickinson | 60/39.55 |
| 5,265,410 A | 11/1993 | Hisatome | |
| 5,271,905 A | 12/1993 | Owen et al. | |
| 5,275,552 A | 1/1994 | Schwartz et al. | |
| 5,295,350 A | 3/1994 | Child et al. | |
| 5,304,362 A | 4/1994 | Madsen | |
| 5,325,660 A | 7/1994 | Taniguchi et al. | |
| 5,332,036 A | 7/1994 | Shirley et al. | |
| 5,344,307 A | 9/1994 | Schwartz et al. | |
| 5,345,756 A | 9/1994 | Jahnke et al. | |
| 5,355,668 A | 10/1994 | Weil et al. | |
| 5,359,847 A | 11/1994 | Pillsbury et al. | |
| 5,361,586 A | 11/1994 | McWhirter et al. | |
| 5,363,913 A * | 11/1994 | Jenneman et al. | 166/246 |
| 5,388,395 A | 2/1995 | Scharpf et al. | |
| 5,394,688 A | 3/1995 | Amos | |
| 5,402,847 A | 4/1995 | Wilson et al. | |
| 5,444,971 A | 8/1995 | Holenberger | |
| 5,457,951 A | 10/1995 | Johnson et al. | |
| 5,458,481 A | 10/1995 | Surbey et al. | |
| 5,468,270 A | 11/1995 | Borszynski | |
| 5,484,019 A * | 1/1996 | Griffith | 166/293 |
| 5,490,378 A | 2/1996 | Berger et al. | |
| 5,542,840 A | 8/1996 | Surbey et al. | |
| 5,566,756 A | 10/1996 | Chaback et al. | |
| 5,572,862 A | 11/1996 | Mowill | |
| 5,581,998 A | 12/1996 | Craig | |
| 5,584,182 A | 12/1996 | Althaus et al. | |
| 5,590,518 A | 1/1997 | Janes | |
| 5,628,182 A | 5/1997 | Mowill | |
| 5,634,329 A | 6/1997 | Andersson et al. | |
| 5,638,675 A | 6/1997 | Zysman et al. | |
| 5,640,840 A | 6/1997 | Briesch | |
| 5,657,631 A | 8/1997 | Androsov | |
| 5,680,764 A | 10/1997 | Viteri | |
| 5,685,158 A | 11/1997 | Lenahan et al. | |
| 5,709,077 A | 1/1998 | Beichel | |
| 5,713,206 A | 2/1998 | McWhirter et al. | |
| 5,715,673 A | 2/1998 | Beichel | |
| 5,724,805 A | 3/1998 | Golomb et al. | |
| 5,725,054 A | 3/1998 | Shayegi et al. | |
| 5,740,786 A | 4/1998 | Gartner | |
| 5,743,079 A | 4/1998 | Walsh et al. | |
| 5,765,363 A | 6/1998 | Mowill | |
| 5,771,867 A | 6/1998 | Amstutz et al. | |
| 5,771,868 A | 6/1998 | Khair | |
| 5,819,540 A | 10/1998 | Massarani | |
| 5,832,712 A | 11/1998 | Ronning et al. | |
| 5,836,164 A | 11/1998 | Tsukahara et al. | |
| 5,839,283 A | 11/1998 | Dobbeling | |
| 5,850,732 A | 12/1998 | Willis et al. | |
| 5,894,720 A | 4/1999 | Willis et al. | |
| 5,901,547 A | 5/1999 | Smith et al. | |
| 5,924,275 A | 7/1999 | Cohen et al. | |

(56) References Cited

U.S. PATENT DOCUMENTS

| | | | |
|---|---|---|---|
| 5,930,990 A | 8/1999 | Zachary et al. | |
| 5,937,634 A | 8/1999 | Etheridge et al. | |
| 5,950,417 A | 9/1999 | Robertson et al. | |
| 5,956,937 A | 9/1999 | Beichel | |
| 5,968,349 A | 10/1999 | Duyvesteyn et al. | |
| 5,974,780 A | 11/1999 | Santos | |
| 5,992,388 A | 11/1999 | Seger | |
| 6,016,658 A | 1/2000 | Willis et al. | |
| 6,032,465 A | 3/2000 | Regnier | |
| 6,035,641 A | 3/2000 | Lokhandwala | |
| 6,062,026 A | 5/2000 | Woollenweber et al. | |
| 6,079,974 A | 6/2000 | Thompson | |
| 6,082,093 A | 7/2000 | Greenwood et al. | |
| 6,089,855 A | 7/2000 | Becker et al. | |
| 6,094,916 A | 8/2000 | Puri et al. | |
| 6,101,983 A | 8/2000 | Anand et al. | |
| 6,148,602 A | 11/2000 | Demetri | |
| 6,170,264 B1 | 1/2001 | Viteri et al. | |
| 6,183,241 B1 | 2/2001 | Bohn et al. | |
| 6,186,228 B1 * | 2/2001 | Wegener et al. | 166/249 |
| 6,201,029 B1 | 3/2001 | Waycuilis | |
| 6,202,400 B1 | 3/2001 | Utamura et al. | |
| 6,202,442 B1 | 3/2001 | Brugerolle | |
| 6,202,574 B1 | 3/2001 | Liljedahl et al. | |
| 6,209,325 B1 | 4/2001 | Alkabie | |
| 6,216,459 B1 | 4/2001 | Daudel et al. | |
| 6,216,549 B1 | 4/2001 | Davis et al. | |
| 6,230,103 B1 | 5/2001 | DeCorso et al. | |
| 6,237,339 B1 * | 5/2001 | .ANG.sen et al. | 60/649 |
| 6,247,315 B1 | 6/2001 | Marin et al. | |
| 6,247,316 B1 | 6/2001 | Viteri | |
| 6,248,794 B1 | 6/2001 | Gieskes | |
| 6,253,555 B1 | 7/2001 | Willis | |
| 6,256,976 B1 | 7/2001 | Kataoka et al. | |
| 6,256,994 B1 | 7/2001 | Dillon, IV | |
| 6,263,659 B1 | 7/2001 | Dillon, IV et al. | |
| 6,266,954 B1 | 7/2001 | McCallum et al. | |
| 6,269,882 B1 | 8/2001 | Wellington et al. | |
| 6,276,171 B1 | 8/2001 | Brugerolle | |
| 6,282,901 B1 | 9/2001 | Marin et al. | |
| 6,283,087 B1 | 9/2001 | Isaksen | |
| 6,289,677 B1 | 9/2001 | Prociw et al. | |
| 6,298,652 B1 | 10/2001 | Mittricker et al. | |
| 6,298,654 B1 | 10/2001 | Vermes et al. | |
| 6,298,664 B1 | 10/2001 | Åsen et al. | |
| 6,301,888 B1 | 10/2001 | Gray | |
| 6,301,889 B1 | 10/2001 | Gladden et al. | |
| 6,305,929 B1 | 10/2001 | Chung et al. | |
| 6,306,917 B1 * | 10/2001 | Bohn et al. | 518/700 |
| 6,314,721 B1 | 11/2001 | Mathews et al. | |
| 6,324,867 B1 | 12/2001 | Fanning et al. | |
| 6,332,313 B1 | 12/2001 | Willis et al. | |
| 6,345,493 B1 | 2/2002 | Smith et al. | |
| 6,360,528 B1 | 3/2002 | Brausch et al. | |
| 6,363,709 B2 | 4/2002 | Kataoka et al. | |
| 6,367,258 B1 | 4/2002 | Wen et al. | |
| 6,370,870 B1 | 4/2002 | Kamijo et al. | |
| 6,374,591 B1 | 4/2002 | Johnson et al. | |
| 6,374,594 B1 | 4/2002 | Kraft et al. | |
| 6,383,461 B1 | 5/2002 | Lang | |
| 6,389,814 B2 | 5/2002 | Viteri et al. | |
| 6,405,536 B1 | 6/2002 | Ho et al. | |
| 6,412,278 B1 | 7/2002 | Matthews | |
| 6,412,302 B1 | 7/2002 | Foglietta | |
| 6,412,559 B1 * | 7/2002 | Gunter et al. | 166/271 |
| 6,418,725 B1 | 7/2002 | Maeda et al. | |
| 6,429,020 B1 | 8/2002 | Thornton et al. | |
| 6,449,954 B2 | 9/2002 | Bachmann | |
| 6,450,256 B2 | 9/2002 | Mones | |
| 6,461,147 B1 | 10/2002 | Sonju et al. | |
| 6,467,270 B2 | 10/2002 | Mulloy et al. | |
| 6,470,682 B2 | 10/2002 | Gray | |
| 6,477,859 B2 | 11/2002 | Wong et al. | |
| 6,484,503 B1 | 11/2002 | Raz | |
| 6,484,507 B1 | 11/2002 | Pradt | |
| 6,487,863 B1 | 12/2002 | Chen et al. | |
| 6,499,990 B1 | 12/2002 | Zink et al. | |
| 6,502,383 B1 | 1/2003 | Janardan et al. | |
| 6,505,567 B1 | 1/2003 | Anderson et al. | |
| 6,505,683 B2 | 1/2003 | Minkkinen et al. | |
| 6,508,209 B1 | 1/2003 | Collier | |
| 6,523,349 B2 | 2/2003 | Viteri | |
| 6,532,745 B1 | 3/2003 | Neary | |
| 6,539,716 B2 | 4/2003 | Finger et al. | |
| 6,584,775 B1 | 7/2003 | Schneider et al. | |
| 6,598,398 B2 | 7/2003 | Viteri et al. | |
| 6,598,399 B2 | 7/2003 | Liebig | |
| 6,598,402 B2 | 7/2003 | Kataoka et al. | |
| 6,606,861 B2 | 8/2003 | Snyder | |
| 6,612,291 B2 | 9/2003 | Sakamoto | |
| 6,615,576 B2 | 9/2003 | Sheoran et al. | |
| 6,615,589 B2 | 9/2003 | Allam et al. | |
| 6,622,470 B2 | 9/2003 | Viteri et al. | |
| 6,622,645 B2 | 9/2003 | Havlena | |
| 6,637,183 B2 | 10/2003 | Viteri et al. | |
| 6,644,041 B1 | 11/2003 | Eyermann | |
| 6,655,150 B1 | 12/2003 | Åsen et al. | |
| 6,668,541 B2 | 12/2003 | Rice et al. | |
| 6,672,863 B2 | 1/2004 | Doebbeling et al. | |
| 6,675,579 B1 | 1/2004 | Yang | |
| 6,684,643 B2 | 2/2004 | Frutschi | |
| 6,694,735 B2 | 2/2004 | Sumser et al. | |
| 6,698,412 B2 | 3/2004 | Betta | |
| 6,702,570 B2 | 3/2004 | Shah et al. | |
| 6,722,436 B2 | 4/2004 | Krill | |
| 6,725,665 B2 | 4/2004 | Tuschy et al. | |
| 6,731,501 B1 | 5/2004 | Cheng | |
| 6,732,531 B2 | 5/2004 | Dickey | |
| 6,742,506 B1 | 6/2004 | Grandin | |
| 6,743,829 B2 | 6/2004 | Fischer-Calderon et al. | |
| 6,745,573 B2 | 6/2004 | Marin et al. | |
| 6,745,624 B2 | 6/2004 | Porter et al. | |
| 6,748,004 B2 | 6/2004 | Jepson | |
| 6,752,620 B2 | 6/2004 | Heier et al. | |
| 6,767,527 B1 | 7/2004 | Åsen et al. | |
| 6,772,583 B2 | 8/2004 | Bland | |
| 6,790,030 B2 | 9/2004 | Fischer et al. | |
| 6,805,483 B2 | 10/2004 | Tomlinson et al. | |
| 6,810,673 B2 | 11/2004 | Snyder | |
| 6,813,889 B2 | 11/2004 | Inoue et al. | |
| 6,817,187 B2 | 11/2004 | Yu | |
| 6,820,428 B2 | 11/2004 | Wylie | |
| 6,821,501 B2 | 11/2004 | Matzakos et al. | |
| 6,823,852 B2 | 11/2004 | Collier | |
| 6,824,710 B2 | 11/2004 | Viteri et al. | |
| 6,826,912 B2 | 12/2004 | Levy et al. | |
| 6,826,913 B2 | 12/2004 | Wright | |
| 6,838,071 B1 | 1/2005 | Olsvik et al. | |
| 6,851,413 B1 | 2/2005 | Tamol | |
| 6,868,677 B2 * | 3/2005 | Viteri et al. | 60/784 |
| 6,886,334 B2 | 5/2005 | Shirakawa | |
| 6,887,069 B1 | 5/2005 | Thornton et al. | |
| 6,899,859 B1 | 5/2005 | Olsvik | |
| 6,901,760 B2 | 6/2005 | Dittmann et al. | |
| 6,904,815 B2 | 6/2005 | Widmer | |
| 6,907,737 B2 | 6/2005 | Mittricker et al. | |
| 6,910,335 B2 | 6/2005 | Viteri et al. | |
| 6,923,915 B2 | 8/2005 | Alford et al. | |
| 6,939,130 B2 | 9/2005 | Abbasi et al. | |
| 6,945,029 B2 * | 9/2005 | Viteri | 60/39.17 |
| 6,945,052 B2 | 9/2005 | Frutschi et al. | |
| 6,945,087 B2 | 9/2005 | Porter et al. | |
| 6,945,089 B2 | 9/2005 | Barie et al. | |
| 6,946,419 B2 | 9/2005 | Kaefer | |
| 6,969,123 B2 | 11/2005 | Vinegar et al. | |
| 6,971,242 B2 | 12/2005 | Boardman | |
| 6,981,358 B2 | 1/2006 | Bellucci et al. | |
| 6,988,549 B1 | 1/2006 | Babcock | |
| 6,993,901 B2 | 2/2006 | Shirakawa | |
| 6,993,916 B2 | 2/2006 | Johnson et al. | |
| 6,994,491 B2 | 2/2006 | Kittle | |
| 7,007,487 B2 | 3/2006 | Belokon et al. | |
| 7,010,921 B2 | 3/2006 | Intile et al. | |
| 7,011,154 B2 | 3/2006 | Maher et al. | |

(56) References Cited

U.S. PATENT DOCUMENTS

| | | | |
|---|---|---|---|
| 7,015,271 | B2 | 3/2006 | Bice et al. |
| 7,032,388 | B2 | 4/2006 | Healy |
| 7,040,400 | B2 | 5/2006 | de Rouffignac et al. |
| 7,043,898 | B2 | 5/2006 | Rago |
| 7,043,920 | B2 | 5/2006 | Viteri et al. |
| 7,045,553 | B2 | 5/2006 | Hershkowitz |
| 7,053,128 | B2 | 5/2006 | Hershkowitz |
| 7,056,482 | B2 | 6/2006 | Hakka et al. |
| 7,059,152 | B2 | 6/2006 | Oakey et al. |
| 7,065,953 | B1 | 6/2006 | Kopko |
| 7,065,972 | B2 | 6/2006 | Zupanc et al. |
| 7,074,033 | B2 | 7/2006 | Neary |
| 7,077,199 | B2 | 7/2006 | Vinegar et al. |
| 7,089,743 | B2 | 8/2006 | Frutschi et al. |
| 7,096,942 | B1 | 8/2006 | de Rouffignac et al. |
| 7,097,925 | B2 | 8/2006 | Keefer |
| 7,104,319 | B2 | 9/2006 | Vinegar et al. |
| 7,104,784 | B1 | 9/2006 | Hasegawa et al. |
| 7,124,589 | B2 | 10/2006 | Neary |
| 7,137,256 | B1 | 11/2006 | Stuttaford et al. |
| 7,137,623 | B2 | 11/2006 | Mockry et al. |
| 7,143,572 | B2 | 12/2006 | Ooka et al. |
| 7,143,606 | B2 | 12/2006 | Tranier |
| 7,146,969 | B2 | 12/2006 | Weirich |
| 7,147,461 | B2 | 12/2006 | Neary |
| 7,148,261 | B2 | 12/2006 | Hershkowitz et al. |
| 7,152,409 | B2 | 12/2006 | Yee et al. |
| 7,162,875 | B2 | 1/2007 | Fletcher et al. |
| 7,168,265 | B2 | 1/2007 | Briscoe et al. |
| 7,168,488 | B2 * | 1/2007 | Olsvik et al. ........... 166/266 |
| 7,183,328 | B2 | 2/2007 | Hershkowitz et al. |
| 7,185,497 | B2 | 3/2007 | Dudebout et al. |
| 7,194,869 | B2 | 3/2007 | McQuiggan et al. |
| 7,197,880 | B2 | 4/2007 | Thornton et al. |
| 7,217,303 | B2 | 5/2007 | Hershkowitz et al. |
| 7,225,623 | B2 | 6/2007 | Koshoffer |
| 7,237,385 | B2 | 7/2007 | Carrea |
| 7,284,362 | B2 | 10/2007 | Marin et al. |
| 7,299,619 | B2 | 11/2007 | Briesch et al. |
| 7,299,868 | B2 | 11/2007 | Zapadinski |
| 7,302,801 | B2 | 12/2007 | Chen |
| 7,305,817 | B2 | 12/2007 | Blodgett et al. |
| 7,305,831 | B2 | 12/2007 | Carrea et al. |
| 7,313,916 | B2 | 1/2008 | Pellizzari |
| 7,318,317 | B2 | 1/2008 | Carrea |
| 7,343,742 | B2 | 3/2008 | Wimmer et al. |
| 7,353,655 | B2 | 4/2008 | Bolis et al. |
| 7,357,857 | B2 | 4/2008 | Hart et al. |
| 7,363,756 | B2 | 4/2008 | Carrea et al. |
| 7,363,764 | B2 | 4/2008 | Griffin et al. |
| 7,381,393 | B2 | 6/2008 | Lynn |
| 7,401,577 | B2 | 7/2008 | Saucedo et al. |
| 7,410,525 | B1 | 8/2008 | Liu et al. |
| 7,416,137 | B2 | 8/2008 | Hagen et al. |
| 7,434,384 | B2 | 10/2008 | Lord et al. |
| 7,438,744 | B2 | 10/2008 | Beaumont |
| 7,467,942 | B2 | 12/2008 | Carroni et al. |
| 7,468,173 | B2 | 12/2008 | Hughes et al. |
| 7,472,550 | B2 | 1/2009 | Lear et al. |
| 7,481,048 | B2 | 1/2009 | Harmon et al. |
| 7,481,275 | B2 | 1/2009 | Olsvik et al. |
| 7,482,500 | B2 | 1/2009 | Johann et al. |
| 7,485,761 | B2 | 2/2009 | Schindler et al. |
| 7,488,857 | B2 | 2/2009 | Johann et al. |
| 7,490,472 | B2 | 2/2009 | Lynghjem et al. |
| 7,491,250 | B2 | 2/2009 | Hershkowitz et al. |
| 7,492,054 | B2 | 2/2009 | Catlin |
| 7,493,769 | B2 | 2/2009 | Jangili |
| 7,498,009 | B2 | 3/2009 | Leach et al. |
| 7,503,178 | B2 | 3/2009 | Bucker et al. |
| 7,503,948 | B2 | 3/2009 | Hershkowitz et al. |
| 7,506,501 | B2 | 3/2009 | Anderson et al. |
| 7,513,099 | B2 | 4/2009 | Nuding et al. |
| 7,513,100 | B2 | 4/2009 | Motter et al. |
| 7,516,626 | B2 | 4/2009 | Brox et al. |
| 7,520,134 | B2 | 4/2009 | Durbin et al. |
| 7,523,603 | B2 | 4/2009 | Hagen et al. |
| 7,536,252 | B1 | 5/2009 | Hibshman et al. |
| 7,536,873 | B2 | 5/2009 | Nohlen |
| 7,540,150 | B2 | 6/2009 | Schmid et al. |
| 7,559,977 | B2 | 7/2009 | Fleischer et al. |
| 7,562,519 | B1 | 7/2009 | Harris et al. |
| 7,562,529 | B2 | 7/2009 | Kuspert et al. |
| 7,566,394 | B2 | 7/2009 | Koseoglu |
| 7,574,856 | B2 | 8/2009 | Mak |
| 7,591,866 | B2 | 9/2009 | Bose |
| 7,594,386 | B2 | 9/2009 | Narayanan et al. |
| 7,610,752 | B2 | 11/2009 | Dalla Betta et al. |
| 7,610,759 | B2 | 11/2009 | Yoshida et al. |
| 7,611,681 | B2 | 11/2009 | Kaefer |
| 7,614,352 | B2 | 11/2009 | Anthony et al. |
| 7,618,606 | B2 | 11/2009 | Fan et al. |
| 7,631,493 | B2 | 12/2009 | Shirakawa et al. |
| 7,634,915 | B2 | 12/2009 | Hoffmann et al. |
| 7,635,408 | B2 | 12/2009 | Mak et al. |
| 7,637,093 | B2 | 12/2009 | Rao |
| 7,644,573 | B2 | 1/2010 | Smith et al. |
| 7,650,744 | B2 | 1/2010 | Varatharajan et al. |
| 7,654,320 | B2 | 2/2010 | Payton |
| 7,654,330 | B2 | 2/2010 | Zubrin et al. |
| 7,655,071 | B2 | 2/2010 | De Vreede |
| 7,670,135 | B1 | 3/2010 | Zink et al. |
| 7,673,454 | B2 | 3/2010 | Saito et al. |
| 7,673,685 | B2 | 3/2010 | Shaw et al. |
| 7,674,443 | B1 | 3/2010 | Davis |
| 7,677,309 | B2 | 3/2010 | Shaw et al. |
| 7,681,394 | B2 | 3/2010 | Haugen |
| 7,682,597 | B2 | 3/2010 | Blumenfeld et al. |
| 7,690,204 | B2 | 4/2010 | Drnevich et al. |
| 7,691,788 | B2 | 4/2010 | Tan et al. |
| 7,695,703 | B2 | 4/2010 | Sobolevskiy et al. |
| 7,717,173 | B2 | 5/2010 | Grott |
| 7,721,543 | B2 | 5/2010 | Massey et al. |
| 7,726,114 | B2 | 6/2010 | Evulet |
| 7,734,408 | B2 | 6/2010 | Shiraki |
| 7,739,864 | B2 | 6/2010 | Finkenrath et al. |
| 7,749,311 | B2 | 7/2010 | Saito et al. |
| 7,752,848 | B2 | 7/2010 | Balan et al. |
| 7,752,850 | B2 | 7/2010 | Laster et al. |
| 7,753,039 | B2 | 7/2010 | Harima et al. |
| 7,753,972 | B2 | 7/2010 | Zubrin et al. |
| 7,762,084 | B2 | 7/2010 | Martis et al. |
| 7,763,163 | B2 | 7/2010 | Koseoglu |
| 7,763,227 | B2 | 7/2010 | Wang |
| 7,765,810 | B2 | 8/2010 | Pfefferle |
| 7,788,897 | B2 | 9/2010 | Campbell et al. |
| 7,789,159 | B1 | 9/2010 | Bader |
| 7,789,658 | B2 | 9/2010 | Towler et al. |
| 7,789,944 | B2 | 9/2010 | Saito et al. |
| 7,793,494 | B2 | 9/2010 | Wirth et al. |
| 7,802,434 | B2 | 9/2010 | Varatharajan et al. |
| 7,815,873 | B2 | 10/2010 | Sankaranarayanan et al. |
| 7,815,892 | B2 | 10/2010 | Hershkowitz et al. |
| 7,819,951 | B2 | 10/2010 | White et al. |
| 7,824,179 | B2 | 11/2010 | Hasegawa et al. |
| 7,827,778 | B2 | 11/2010 | Finkenrath et al. |
| 7,827,794 | B1 | 11/2010 | Pronske et al. |
| 7,841,186 | B2 | 11/2010 | So et al. |
| 7,845,406 | B2 | 12/2010 | Nitschke |
| 7,846,401 | B2 | 12/2010 | Hershkowitz et al. |
| 7,861,511 | B2 | 1/2011 | Chillar et al. |
| 7,874,140 | B2 | 1/2011 | Fan et al. |
| 7,874,350 | B2 | 1/2011 | Pfefferle |
| 7,875,402 | B2 | 1/2011 | Hershkowitz et al. |
| 7,882,692 | B2 | 2/2011 | Pronske et al. |
| 7,886,522 | B2 | 2/2011 | Kammel |
| 7,895,822 | B2 | 3/2011 | Hoffmann et al. |
| 7,896,105 | B2 | 3/2011 | Dupriest |
| 7,906,304 | B2 | 3/2011 | Kohr |
| 7,909,898 | B2 | 3/2011 | White et al. |
| 7,914,749 | B2 | 3/2011 | Carstens et al. |
| 7,914,764 | B2 | 3/2011 | Hershkowitz et al. |
| 7,918,906 | B2 | 4/2011 | Zubrin et al. |
| 7,921,633 | B2 | 4/2011 | Rising |

(56) References Cited

U.S. PATENT DOCUMENTS

| | | | |
|---|---|---|---|
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 2001/0000049 A1 | 3/2001 | Kataoka et al. |
| 2001/0029732 A1 | 10/2001 | Bachmann |
| 2001/0045090 A1 | 11/2001 | Gray |
| 2002/0036086 A1* | 3/2002 | Minkkinen et al. ........... 166/266 |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0201098 A1* | 10/2003 | Karanikas et al. .............. 166/53 |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0000357 A1* | 1/2006 | Michael ........................... 95/273 |
| 2006/0112675 A1 | 6/2006 | Anderson et al. |
| 2006/0115691 A1* | 6/2006 | Hilmen et al. .................. 429/13 |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0230935 A1* | 10/2006 | Michael et al. ................. 95/273 |
| 2006/0231252 A1* | 10/2006 | Shaw et al. ................. 166/272.3 |
| 2006/0231455 A1* | 10/2006 | Olsvik et al. ..................... 208/62 |
| 2006/0248888 A1 | 11/2006 | Geskes |
| 2006/0272813 A1* | 12/2006 | Olsvik et al. ............... 166/272.3 |
| 2006/0278359 A1* | 12/2006 | Wheaton et al. ............... 162/256 |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0082306 A1* | 4/2007 | Drnevich et al. ................. 431/12 |
| 2007/0089425 A1 | 4/2007 | Motter et al. |
| 2007/0107430 A1 | 5/2007 | Schmid et al. |
| 2007/0125533 A1* | 6/2007 | Minderhoud et al. ......... 166/267 |
| 2007/0131419 A1* | 6/2007 | Maria Roes et al. .......... 166/267 |
| 2007/0131420 A1* | 6/2007 | Mo et al. ....................... 166/267 |
| 2007/0131427 A1* | 6/2007 | Li et al. ......................... 166/302 |
| 2007/0131428 A1* | 6/2007 | Willem Cornelis den Boestert et al. ............................. 166/302 |
| 2007/0144747 A1 | 6/2007 | Steinberg |
| 2007/0151454 A1* | 7/2007 | Marwitz et al. ..................... 96/7 |
| 2007/0204620 A1* | 9/2007 | Pronske et al. ................. 60/671 |
| 2007/0209799 A1* | 9/2007 | Vinegar et al. ................ 166/302 |
| 2007/0231233 A1 | 10/2007 | Bose |
| 2007/0234702 A1 | 10/2007 | Hagen et al. |
| 2007/0237696 A1* | 10/2007 | Payton ........................... 423/228 |
| 2007/0245736 A1 | 10/2007 | Barnicki |
| 2007/0249738 A1 | 10/2007 | Haynes et al. |
| 2007/0272201 A1 | 11/2007 | Amano et al. |

(56) References Cited

U.S. PATENT DOCUMENTS

| | | | |
|---|---|---|---|
| 2008/0000229 A1 | 1/2008 | Kuspert et al. | |
| 2008/0006561 A1 | 1/2008 | Moran et al. | |
| 2008/0010967 A1 | 1/2008 | Griffin et al. | |
| 2008/0034727 A1 | 2/2008 | Sutikno | |
| 2008/0038598 A1 | 2/2008 | Berlowitz et al. | |
| 2008/0047280 A1 | 2/2008 | Dubar | |
| 2008/0066443 A1 | 3/2008 | Frutschi et al. | |
| 2008/0066538 A1* | 3/2008 | Kamiya et al. | 73/152.28 |
| 2008/0115478 A1 | 5/2008 | Sullivan | |
| 2008/0118310 A1 | 5/2008 | Graham | |
| 2008/0127632 A1 | 6/2008 | Finkenrath et al. | |
| 2008/0155984 A1 | 7/2008 | Liu et al. | |
| 2008/0178611 A1 | 7/2008 | Ding | |
| 2008/0202123 A1 | 8/2008 | Sullivan et al. | |
| 2008/0223038 A1 | 9/2008 | Lutz et al. | |
| 2008/0250795 A1 | 10/2008 | Katdare et al. | |
| 2008/0251234 A1 | 10/2008 | Wilson et al. | |
| 2008/0290719 A1 | 11/2008 | Kaminsky et al. | |
| 2008/0309087 A1 | 12/2008 | Evulet et al. | |
| 2009/0000762 A1 | 1/2009 | Wilson et al. | |
| 2009/0025390 A1 | 1/2009 | Christensen et al. | |
| 2009/0038247 A1 | 2/2009 | Taylor et al. | |
| 2009/0056342 A1 | 3/2009 | Kirzhner | |
| 2009/0064653 A1 | 3/2009 | Hagen et al. | |
| 2009/0071166 A1 | 3/2009 | Hagen et al. | |
| 2009/0107141 A1 | 4/2009 | Chillar et al. | |
| 2009/0117024 A1 | 5/2009 | Weedon et al. | |
| 2009/0120087 A1 | 5/2009 | Sumser et al. | |
| 2009/0157230 A1 | 6/2009 | Hibshman et al. | |
| 2009/0193809 A1 | 8/2009 | Schroder et al. | |
| 2009/0205334 A1 | 8/2009 | Aljabari et al. | |
| 2009/0218821 A1 | 9/2009 | ElKady et al. | |
| 2009/0223227 A1 | 9/2009 | Lipinski et al. | |
| 2009/0229263 A1 | 9/2009 | Ouellet et al. | |
| 2009/0235637 A1 | 9/2009 | Foret | |
| 2009/0241506 A1 | 10/2009 | Nilsson | |
| 2009/0255242 A1 | 10/2009 | Paterson et al. | |
| 2009/0262599 A1 | 10/2009 | Kohrs et al. | |
| 2009/0284013 A1 | 11/2009 | Anand et al. | |
| 2009/0301054 A1 | 12/2009 | Simpson et al. | |
| 2009/0301099 A1 | 12/2009 | Nigro | |
| 2010/0003123 A1 | 1/2010 | Smith | |
| 2010/0018218 A1 | 1/2010 | Riley et al. | |
| 2010/0058732 A1 | 3/2010 | Kaufmann et al. | |
| 2010/0115960 A1 | 5/2010 | Brautsch et al. | |
| 2010/0126176 A1 | 5/2010 | Kim | |
| 2010/0126906 A1 | 5/2010 | Sury | |
| 2010/0162703 A1 | 7/2010 | Li et al. | |
| 2010/0170253 A1 | 7/2010 | Berry et al. | |
| 2010/0180565 A1 | 7/2010 | Draper | |
| 2010/0300102 A1 | 12/2010 | Bathina et al. | |
| 2010/0310439 A1 | 12/2010 | Brok et al. | |
| 2010/0322759 A1 | 12/2010 | Tanioka | |
| 2010/0326084 A1 | 12/2010 | Anderson et al. | |
| 2011/0000221 A1 | 1/2011 | Minta et al. | |
| 2011/0000671 A1 | 1/2011 | Hershkowitz et al. | |
| 2011/0036082 A1 | 2/2011 | Collinot | |
| 2011/0048002 A1 | 3/2011 | Taylor et al. | |
| 2011/0048010 A1 | 3/2011 | Balcezak et al. | |
| 2011/0072779 A1 | 3/2011 | ElKady et al. | |
| 2011/0088379 A1 | 4/2011 | Nanda | |
| 2011/0110759 A1 | 5/2011 | Sanchez et al. | |
| 2011/0126512 A1 | 6/2011 | Anderson | |
| 2011/0138766 A1 | 6/2011 | ElKady et al. | |
| 2011/0162353 A1 | 7/2011 | Vanvolsem et al. | |
| 2011/0205837 A1 | 8/2011 | Gentgen | |
| 2011/0226010 A1 | 9/2011 | Baxter | |
| 2011/0227346 A1 | 9/2011 | Klenven | |
| 2011/0232545 A1 | 9/2011 | Clements | |
| 2011/0239653 A1 | 10/2011 | Valeev et al. | |
| 2011/0265447 A1 | 11/2011 | Cunningham | |
| 2011/0300493 A1 | 12/2011 | Mittricker et al. | |
| 2012/0023954 A1 | 2/2012 | Wichmann | |
| 2012/0023955 A1 | 2/2012 | Draper | |
| 2012/0023956 A1 | 2/2012 | Popovic | |
| 2012/0023957 A1 | 2/2012 | Draper et al. | |
| 2012/0023958 A1 | 2/2012 | Snook et al. | |
| 2012/0023960 A1 | 2/2012 | Minto | |
| 2012/0023962 A1 | 2/2012 | Wichmann et al. | |
| 2012/0023963 A1 | 2/2012 | Wichmann et al. | |
| 2012/0023966 A1 | 2/2012 | Ouellet et al. | |
| 2012/0031581 A1 | 2/2012 | Chillar et al. | |
| 2012/0032810 A1 | 2/2012 | Chillar et al. | |
| 2012/0085100 A1 | 4/2012 | Hughes et al. | |
| 2012/0096870 A1 | 4/2012 | Wichmann et al. | |
| 2012/0119512 A1 | 5/2012 | Draper | |
| 2012/0131925 A1 | 5/2012 | Mittricker et al. | |
| 2012/0144837 A1 | 6/2012 | Rasmussen et al. | |
| 2012/0185144 A1 | 7/2012 | Draper | |
| 2012/0192565 A1 | 8/2012 | Tretyakov et al. | |
| 2012/0247105 A1 | 10/2012 | Nelson et al. | |
| 2012/0260660 A1 | 10/2012 | Kraemer et al. | |
| 2013/0086916 A1 | 4/2013 | Oelfke et al. | |
| 2013/0086917 A1 | 4/2013 | Slobodyanskiy et al. | |
| 2013/0091853 A1 | 4/2013 | Denton et al. | |
| 2013/0091854 A1 | 4/2013 | Gupta et al. | |
| 2013/0104562 A1 | 5/2013 | Oelfke et al. | |
| 2013/0104563 A1 | 5/2013 | Oelfke et al. | |
| 2013/0125554 A1 | 5/2013 | Mittricker et al. | |
| 2013/0125555 A1 | 5/2013 | Mittricker et al. | |
| 2013/0232980 A1 | 9/2013 | Chen et al. | |
| 2013/0269310 A1 | 10/2013 | Wichmann et al. | |
| 2013/0269311 A1 | 10/2013 | Wichmann et al. | |
| 2013/0269355 A1 | 10/2013 | Wichmann et al. | |
| 2013/0269356 A1 | 10/2013 | Butkiewicz et al. | |
| 2013/0269357 A1 | 10/2013 | Wichmann et al. | |
| 2013/0269358 A1 | 10/2013 | Wichmann et al. | |
| 2013/0269360 A1 | 10/2013 | Wichmann et al. | |
| 2013/0269361 A1 | 10/2013 | Wichmann et al. | |
| 2013/0269362 A1 | 10/2013 | Wichmann et al. | |
| 2013/0283808 A1 | 10/2013 | Kolvick | |
| 2014/0000271 A1 | 1/2014 | Mittricker et al. | |
| 2014/0000273 A1 | 1/2014 | Mittricker et al. | |
| 2014/0007590 A1 | 1/2014 | Huntington et al. | |
| 2014/0013766 A1 | 1/2014 | Mittricker et al. | |
| 2014/0020398 A1 | 1/2014 | Mittricker et al. | |
| 2014/0060073 A1 | 3/2014 | Slobodyanskiy et al. | |
| 2014/0123620 A1 | 5/2014 | Huntington et al. | |
| 2014/0123624 A1 | 5/2014 | Minto | |
| 2014/0123659 A1 | 5/2014 | Biyani et al. | |
| 2014/0123660 A1 | 5/2014 | Stoia et al. | |
| 2014/0123668 A1 | 5/2014 | Huntington et al. | |
| 2014/0123669 A1 | 5/2014 | Huntington et al. | |
| 2014/0123672 A1 | 5/2014 | Huntington et al. | |

FOREIGN PATENT DOCUMENTS

| | | |
|---|---|---|
| EP | 0770771 | 5/1997 |
| GB | 0776269 | 6/1957 |
| GB | 2117053 | 10/1983 |
| WO | WO9906674 | 2/1999 |
| WO | WO9963210 | 12/1999 |
| WO | WO2007068682 | 6/2007 |
| WO | WO2008142009 | 11/2008 |
| WO | WO2011003606 | 1/2011 |
| WO | WO2012003489 | 1/2012 |
| WO | WO2012128928 | 9/2012 |
| WO | WO2012128929 | 9/2012 |
| WO | WO2012170114 | 12/2012 |
| WO | PCT/RU2013/000162 | 2/2013 |
| WO | WO2013147632 | 10/2013 |
| WO | WO2013147633 | 10/2013 |
| WO | WO2013155214 | 10/2013 |
| WO | WO2013163045 | 10/2013 |
| WO | WO2014071118 | 5/2014 |
| WO | WO2014071215 | 5/2014 |

OTHER PUBLICATIONS

Air Products and Chemicals, Inc. (2008) "Air Separation Technology—Ion Transport Membrane (ITM)," www.airproducts.com/ASUsales, 3 pgs.

Air Products and Chemicals, Inc. (2011) "Air Separation Technology Ion Transport Membrane (ITM)," www.airproducts.com/gasification, 4 pgs.

(56) References Cited

OTHER PUBLICATIONS

Anderson, R. E. (2006) "Durability and Reliability Demonstration of a Near-Zero-Emission Gas-Fired Power Plant," California Energy Comm., CEC 500-2006-074, 80 pgs.

Baxter, E. et al. (2003) "Fabricate and Test an Advanced Non-Polluting Turbine Drive Gas Generator," U.S. Dept. of Energy, Nat'l Energy Tech. Lab., DE-FC26-00NT 40804, 51 pgs.

Bolland, O. et al. (1998) "Removal of CO2 From Gas Turbine Power Plants Evaluation of Pre- and Postcombustion Methods," SINTEF Group, www.energy.sintef.no/publ/xergi/98/3/art-8engelsk.htm, 11 pgs.

BP Press Release (2006) "BP and Edison Mission Group Plan Major Hydrogen Power Project for California," www.bp.com/hydrogenpower, 2 pgs.

Bryngelsson, M. et al. (2005) "Feasibility Study of $CO_2$ Removal From Pressurized Flue Gas in a Fully Fired Combined Cycle—The Sargas Project," KTH—Royal Institute Of Technology, Dept. of Chemical Engineering And Technology, 9 pgs.

Clark, Hal (2002) "Development of a Unique Gas Generator for a Non-Polluting Power Plant," California Energy Commission Feasibility Analysis, P500-02-011F, 42 pgs.

Foy, Kirsten et al. (2005) "Comparison of Ion Transport Membranes," Fourth Annual Conference on Carbon Capture and Sequestration, DOE/NETL; 11 pgs.

Cho, J. H. et al. (2005) "Marrying LNG and Power Generation," Energy Markets; 10, 8; ABI/INFORM Trade & Industry, 8 pgs.

Ciulia, Vincent. (2001-2003) "Auto Repair. How the Engine Works,", http://autorepair.about.com/cs/generalinfo/a/aa060500a.htm, 1 page.

Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, 4 pgs.

Science Clarified (2012) "Cryogenics," http://www.scienceclarified.com/Co-Di/Cryogenics.html; 6 pgs.

Defrate, L. A. et al. (1959) "Optimum Design of Ejector Using Digital Computers," Chem. Eng. Prog. Symp. Ser., 55 (21), 12 pgs.

Ditaranto, M. et al. (2006) "Combustion Instabilities in Sudden Expansion Oxy-Fuel Flames," ScienceDirect, Combustion And Flame, v.146, 19 pgs.

Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.

Eriksson, Sara. (2005) "Development of Methane Oxidation Catalysts for Different Gas Turbine Combustor Concepts," KTH—The Royal Institute of Technology, Department of Chemical Engineering and Technology, Chemical Technology, Licentiate Thesis, Stockholm Sweden; 45 pgs.

Ertesvag, I. S. et al. (2005) "Exergy Analysis of a Gas-Turbine Combined-Cycle Power Plant With Precombustion $CO_2$ Capture," Elsevier, 34 pgs.

ElKady, Ahmed M. et al. (2009) "Application of Exhaust Gas Recirculation in a DLN F-Class Combustion System for Postcombustion Carbon Capture," ASME J. Engineering for Gas Turbines and Power, vol. 131, 6 pgs.

Evulet, Andrei T. et al. (2009) "On the Performance and Operability of GE's Dry Low $NO_x$ Combustors utilizing Exhaust Gas Recirculation for Post-Combustion Carbon Capture," Energy Procedia I, 7 pgs.

Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf, 22 pgs.

Luby, P. et al. (2003) "Zero Carbon Power Generation: IGCC as the Premium Option," Powergen International, 19 pgs.

MacAdam, S. et al. (2007) "Coal-Based Oxy-Fuel System Evaluation and Combustor Development," Clean Energy Systems, Inc.; presented at the $2^{nd}$ International Freiberg Conference on IGCC & XtL Technologies, 6 pgs.

Morehead, H. (2007) "Siemens Global Gasification and IGCC Update," Siemens, Coal-Gen, 17 pgs.

Nanda, R. et al. (2007) "Utilizing Air Based Technologies as Heat Source for LNG Vaporization," presented at the $86^{th}$ Annual convention of the Gas Processors of America (GPA 2007), San Antonio, TX; 13 pgs.

Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.

Reeves, S. R. (2003) "Enhanced Coalbed Methane Recovery," Society of Petroleum Engineers 101466-DL; SPE Distinguished Lecture Series, 8 pgs.

Richards, Geo A., et al (2001) "Advanced Steam Generators," National Energy Technology Lab., Pittsburgh, PA, and Morgantown, WV; NASA Glenn Research Center (US).

Rosetta, M. J. et al. (2006) "Integrating Ambient Air Vaporization Technology with Waste Heat Recovery—A Fresh Approach to LNG Vaporization," presented at the $85^{th}$ annual convention of the Gas Processors of America (GPA 2006), Grapevine, Texas, 22 pgs.

Snarheim, D. et al. (2006) "Control Design for a Gas Turbine Cycle With $CO_2$ Capture Capabilities," Modeling, Identification And Control, vol. 00; presented at the $16^{th}$ IFAC World Congress, Prague, Czech Republic, 10 pgs.

Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.

van Hemert, P. et al. (2006) "Adsorption of Carbon Dioxide and a Hydrogen-Carbon Dioxide Mixture," Int'l Coalbed Methane Symposium (Tuscaloosa, AL) Paper 0615, 9 pgs.

Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.

U.S. Appl. No. 14/144,511, filed Dec. 30, 2013, Thatcher et al.
U.S. Appl. No. 14/067,679, filed Oct. 30, 2013, Fadde et al.
U.S. Appl. No. 14/067,714, filed Oct. 30, 2013, Antoniono et al.
U.S. Appl. No. 14/067,726, filed Oct. 30, 2013, Antoniono et al.
U.S. Appl. No. 14/067,731, filed Oct. 30, 2013, Antoniono et al.
U.S. Appl. No. 14/067,739, filed Oct. 30, 2013, Antoniono et al.
U.S. Appl. No. 14/067,797, filed Oct. 31, 2013, Krull et al.
U.S. Appl. No. 14/135,055, filed Dec. 19, 2013, Biyani et al.

\* cited by examiner

US 8,984,857 B2

LOW EMISSION POWER GENERATION AND HYDROCARBON RECOVERY SYSTEMS AND METHODS

CROSS REFERENCE TO RELATED APPLICATIONS

This application is the National Stage of International Application No. PCT/US2009/038247, filed 25 Mar. 2009 which claims the benefit of U.S. Provisional Application No. 61/072,292, filed 28 Mar. 2008 and U.S. Provisional Application No. 61/153,508, filed 18 Feb. 2009. The entirety of each of these applications is incorporated herein by reference for all purposes.

FIELD OF THE INVENTION

Embodiments of the invention relate to low emission power generation in hydrocarbon recovery processes. More particularly, embodiments of the invention relate to methods and apparatuses for utilizing nitrogen, oxygen, carbon dioxide, and hydrocarbon fuel to generate power in a very low emission hydrocarbon recovery process.

BACKGROUND OF THE INVENTION

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Many enhanced hydrocarbon recovery operations can be classified as one of the following types: pressure maintenance and miscible flooding. In a pressure maintenance operation, inert gasses such as nitrogen are injected into a primarily gaseous reservoir to maintain at least a minimal pressure in the reservoir to prevent retrograde condensation and improve total recovery. In a miscible flooding operation, miscible gasses such as carbon dioxide are injected into a primarily liquidous reservoir to mix with the liquids, lowering their viscosity and increasing pressure to improve the recovery rate.

Many oil producing countries are experiencing strong domestic growth in power demand and have an interest in enhanced oil recovery (EOR) to improve oil recovery from their reservoirs. Two common EOR techniques include nitrogen ($N_2$) injection for reservoir pressure maintenance and carbon dioxide ($CO_2$) injection for miscible flooding for EOR. There is also a global concern regarding green house gas (GHG) emissions. This concern combined with the implementation of cap-and-trade policies in many countries make reducing $CO_2$ emissions a priority for these and other countries as well as the companies that operate hydrocarbon production systems therein.

Some approaches to lower $CO_2$ emissions include fuel de-carbonization or post-combustion capture. However, both of these solutions are expensive and reduce power generation efficiency, resulting in lower power production, increased fuel demand and increased cost of electricity to meet domestic power demand. Another approach is an oxyfuel gas turbine in a combined cycle (e.g. where exhaust heat from the gas turbine Brayton cycle is captured to make steam and produce additional power in a Rankin cycle). However, there are no commercially available gas turbines that can operate in such a cycle and the power required to produce high purity oxygen significantly reduces the overall efficiency of the process.

Several studies have compared these processes and show some of the advantages of each approach. See, e.g. BOLLAND, OLAV, and UNDRUM, HENRIETTE, Removal of $CO_2$ from Gas Turbine Power Plants: Evaluation of pre- and post-combustion methods, SINTEF Group, found at http://www.energy.sintef.no/publ/xergi/98/3/3art-8-engelsk.htm (1998).

U.S. Pat. No. 4,344,486 (the '486 patent) discloses a process of adding substantially pure oxygen to the produced hydrocarbons and carbon dioxide from a liquid producing formation to produce heat or power and re-injecting the carbon dioxide for EOR. The '486 patent discloses separating hydrocarbon liquids from gaseous constituents in a production stream of a liquid producing formation, then mixing the gaseous constituents with substantially pure oxygen and combusting the mixture to produce heat and $CO_2$. The $CO_2$ is then injected into the same or a different liquid producing formation. This approach fails to teach or suggest a solution to the efficiency drag from the oxygen plant.

U.S. Pat. Pub. No. 2007/0237696 (the '696 publication) discloses essentially a combination of the oxy-fuel process and EOR as disclosed in the '486 patent. The '696 publication also requires a stand-alone oxygen plant or air separation plant, and fails to teach or suggest a working gas power turbine configuration.

As such, there is still a substantial need for a low emission, high efficiency hydrocarbon recovery process.

SUMMARY OF THE INVENTION

One embodiment of the present invention discloses an integrated system. The integrated system includes an air separation unit configured to produce a high purity oxygen stream and a high purity nitrogen stream; a gaseous control fuel stream; a combustion unit configured to combust at least the gaseous control fuel stream and the high purity oxygen stream to produce a gaseous combustion stream having carbon dioxide and water; a power generation system configured to receive the gaseous combustion stream having carbon dioxide and water and produce at least a compressed gaseous substantially carbon dioxide stream; a first injector unit configured to inject at least a portion of the compressed gaseous substantially carbon dioxide stream into an enhanced oil recovery reservoir; and a second injector unit configured to inject at least a portion of the high purity nitrogen stream into a pressure maintenance reservoir. In one embodiment, the power generation system comprises an expander configured to receive the gaseous combustion stream and produce at least one unit of mechanical power and a gaseous exhaust stream; a heat recovery unit configured to receive and cool the gaseous exhaust stream, produce at least one unit of heat energy, and generate at least a volume of water and a cooled gaseous substantially carbon dioxide stream, wherein the heat energy is optionally utilized to generate steam to generate steam power; and a carbon dioxide compressor configured to compress the cooled gaseous substantially carbon dioxide stream to produce the compressed gaseous substantially carbon dioxide stream. The system may also include a first hydrocarbon recovery reservoir configured to produce a first hydrocarbon mixture; and a first hydrocarbon separation unit configured to separate at least liquid hydrocarbons from the first hydrocarbon mixture and produce a first hydrocarbon stream and a secondary gas stream comprising carbon dioxide, wherein the combustion unit is further configured to utilize at least a portion of the secondary gas stream with the gaseous control fuel stream and the high purity oxygen stream to produce the gaseous combustion stream having carbon dioxide and water. The system may further include a second hydrocarbon recovery reservoir configured to produce a second hydrocarbon mixture; and a second hydrocarbon separation unit configured to separate at least liquid hydrocarbons from the second hydrocarbon mixture and produce a second hydrocarbon stream and an inert gas stream comprising nitrogen, wherein the second injector is further configured to inject the inert gas stream into the pressure maintenance reservoir.

Another embodiment of the present invention discloses a method of improved hydrocarbon recovery. The method includes separating air into a high purity oxygen stream and a high purity nitrogen stream; providing a gaseous control fuel stream; combusting in a combustor, at least the gaseous control fuel stream and the high purity oxygen stream to form a gaseous combustion stream having carbon dioxide and water; receiving the gaseous combustion stream having carbon dioxide and water into a power generation system, wherein the power generation system produces at least a compressed gaseous substantially carbon dioxide stream; injecting at least a portion of the compressed gaseous substantially carbon dioxide stream into an enhanced oil recovery reservoir; and injecting at least a portion of the high purity nitrogen stream into a pressure maintenance reservoir.

In a third embodiment of the present invention, a low emission power generation system is disclosed. The system includes a first hydrocarbon recovery reservoir configured to produce a first hydrocarbon mixture; a first hydrocarbon separation unit configured to separate at least liquid hydrocarbons from the first hydrocarbon mixture and produce a first hydrocarbon stream and a secondary gas stream comprising carbon dioxide; a gaseous control fuel stream; a high purity oxygen stream; an external combustor configured to combust a combination of the gaseous control fuel stream, the high purity oxygen stream, and the secondary gas stream comprising carbon dioxide to produce a gaseous combustion stream; a hot gas expander configured to receive the gaseous combustion stream and produce at least one unit of mechanical power and a gaseous exhaust stream having at least a carbon dioxide component and a water component; and a handling system configured to condition the gaseous exhaust stream to substantially remove the water component therefrom and utilize at least a portion of the carbon dioxide component.

In a fourth embodiment of the present invention, a method of generating low emission power is provided. The method includes producing a first hydrocarbon mixture from a first hydrocarbon recovery reservoir; separating the first hydrocarbon mixture into a first hydrocarbon stream and a secondary gas stream comprising carbon dioxide; providing a high purity oxygen stream; providing a gaseous control fuel stream; combusting, in an external combustor, a combination of at least the high purity oxygen stream and the gaseous control fuel stream to produce a gaseous combustion stream having carbon dioxide and water; expanding the gaseous combustion stream in a hot gas expander to produce at least one unit of mechanical power and a gaseous exhaust stream having a water component and a carbon dioxide component; removing at least a portion of the water component from the gaseous exhaust stream; and utilizing at least a portion of the carbon dioxide component of the exhaust stream.

In a fifth embodiment of the present invention, a low emission power generation system is disclosed. The system includes a first hydrocarbon recovery reservoir configured to produce a first hydrocarbon mixture; a first hydrocarbon separation unit configured to separate at least liquid hydrocarbons from the liquid hydrocarbon mixture and produce a first hydrocarbon stream and a secondary gas stream comprising carbon dioxide; a gaseous control fuel stream; an air separation unit configured to provide at least a high purity oxygen stream; a combustor configured to combust a combination of the gaseous control fuel stream, the high purity oxygen stream, and the secondary gas stream comprising carbon dioxide to produce a gaseous combustion stream; and a gas power turbine. The gas power turbine includes an inlet compressor, wherein the inlet compressor is configured to compress atmospheric air to send to the air separation unit; and an expander configured to receive the gaseous combustion stream and produce at least one unit of mechanical power and a gaseous exhaust stream having at least a carbon dioxide component and a water component. The power generation system further includes a handling system configured to condition the gaseous exhaust stream to substantially remove the water component of the gaseous exhaust stream and utilize at least a portion of the carbon dioxide component of the gaseous exhaust stream.

In a sixth embodiment of the present invention, a method of low emission power generation is provided. The method includes producing a first hydrocarbon mixture from a first hydrocarbon recovery reservoir; separating the first hydrocarbon mixture into a first hydrocarbon stream and a secondary gas stream comprising carbon dioxide; separating air in an air separation unit configured to produce at least a high purity oxygen stream; providing a gaseous control fuel stream; combusting, in a combustor, a combination of at least the high purity oxygen stream and the gaseous control fuel stream to produce a gaseous combustion stream having carbon dioxide and water; compressing air in an inlet compressor of a gas power turbine to form a compressed air stream; providing the compressed air stream to the air separation unit; expanding the gaseous combustion stream in an expander of the gas power turbine to produce at least one unit of mechanical power and a gaseous exhaust stream having at least a water component and a carbon dioxide component; removing at least a portion of the water component from the gaseous exhaust stream; and utilizing at least a portion of the carbon dioxide component.

BRIEF DESCRIPTION OF THE DRAWINGS

The foregoing and other advantages of the present invention may become apparent upon reviewing the following detailed description and drawings of non-limiting examples of embodiments in which.

DETAILED DESCRIPTION OF THE INVENTION

Figure 1A:
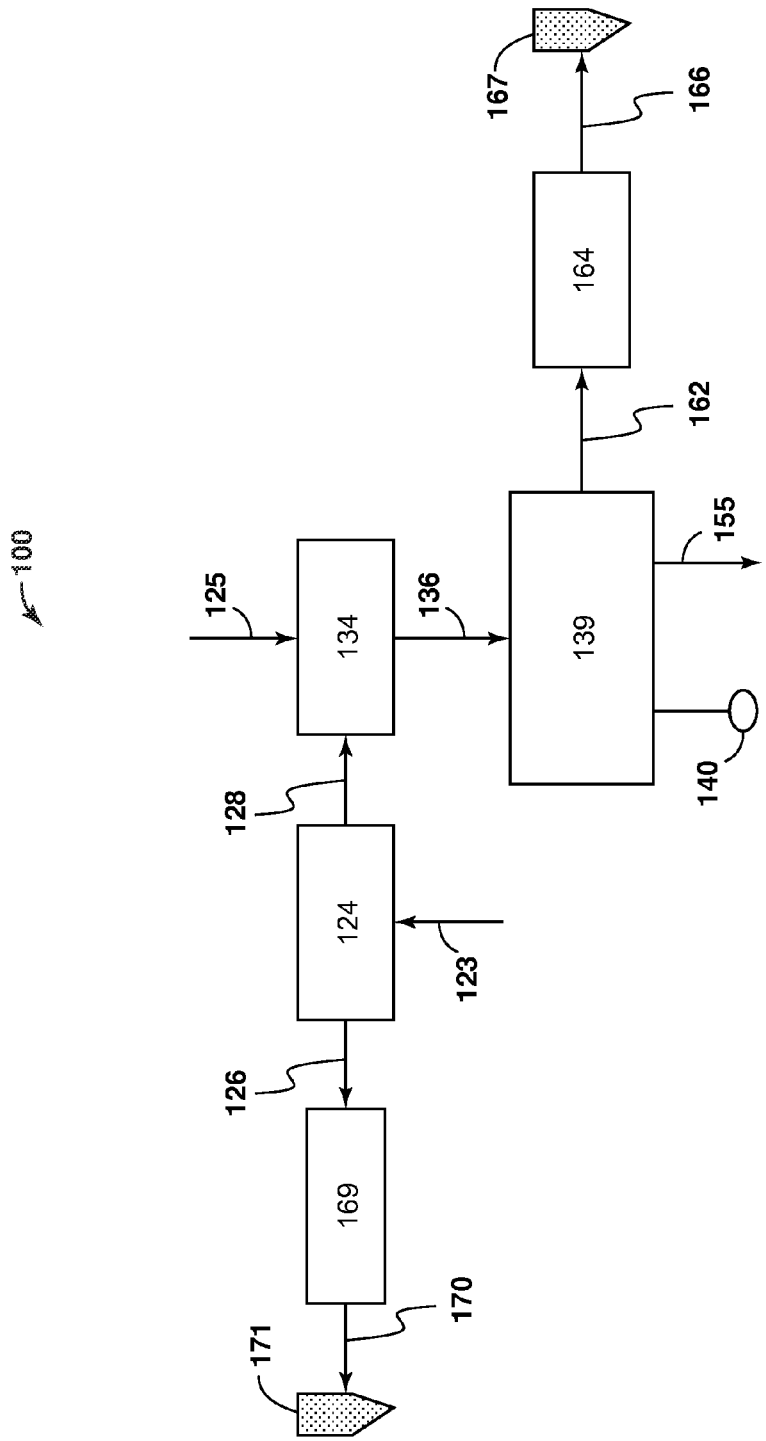
FIGS. 1A-1B illustrate an integrated system for low emission power generation and hydrocarbon recovery of the present invention.

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

At least one benefit of the system is integration of two types of recovery processes to produce two types of injection gas (nitrogen and $CO_2$) for additional hydrocarbon recovery. To accomplish this air is first compressed. The heat generated during compression may be captured and used for power generation or salt water desalination. The cool compressed air is then sent to an air separation unit (ASU). The ASU produces a nitrogen stream and an oxygen stream. The oxygen is combined with fuel gas and $CO_2$ and used for the combustion of hydrocarbons. The products of combustion are then sent to an expander to produce power, which may be a hot gas expander or an expander of a gas power turbine (which may be on an integrated shaft with a power generator or driving a separate generator). The exhaust gas from the expander is then used to either heat the $CO_2$ going to the combustor to improve cycle efficiency, to produce steam that can be used for additional power production or salt water desalination or for both heating the $CO_2$ going to the combustor increasing the efficiency and for power and/or desalinization. The products of the combustion ($CO_2$ and water) are then further cooled to condense the water and produce a $CO_2$ stream that can be recycled in the system optionally to pre-mix with the oxygen stream for dilution thereof, sequestered, used in enhanced oil recovery (EOR), or sold to a third party.

Embodiments of the presently disclosed systems and processes may be used to produce ultra low emission electric power and $CO_2$ for EOR. By utilizing the $CO_2$ normally recycled back for additional EOR in a power cycle, electric power can be produced with little or no NOx or $CO_2$ being emitted to the atmosphere. The $CO_2$ and light hydrocarbons from the normal EOR recovery system are compressed and combusted with oxygen and other fuel gas, then expanded in a hot gas expander to produce electric power. Additional power may also be produced by heat recovery on the exhaust gases from the hot gas expander in a condensing steam cycle such as a heat recovery steam generator (HRSG). Since the products of stoichiometric combustion are only $CO_2$ and water, a high purity $CO_2$ stream can be produced by cooling the flue gas and condensing the water out of the stream. The result of this process is the production of power and the manufacturing of additional $CO_2$. The $CO_2$ stream (minus a recycle component in some embodiments) is then sent back to the EOR facilities for additional compression and re-injection back into the wells for additional oil recovery.

Although it is possible to produce nitrogen for reservoir pressure maintenance and carbon dioxide for EOR completely independently, embodiments of the disclosed systems and methods take advantage of the synergies that are possible when both nitrogen and carbon dioxide are produced in an integrated process to accomplish the production of these gases at a much lower cost while also producing power and/or desalinated water with ultra low emissions. Note, that if EOR utilization is not possible, the $CO_2$ produced by the power production can be purged from the recycle stream and sequestered or stored. This allows the various embodiments to be utilized for power production with ultra-low emissions.

In a typical gas well pressure enhancement or maintenance operation, nitrogen is generally produced by separating it from air (e.g. in an ASU) to reach the specification on the nitrogen stream required for injection into the wells. Such a process produces an enriched oxygen stream that is vented back into the atmosphere. By adding a relatively small amount of incremental power and investment to the ASU, the air can be separated into both a high purity nitrogen and a high purity oxygen stream. To produce inexpensive $CO_2$ a high purity oxygen stream is desirable. If combustion occurs with significant amounts of nitrogen present, then expensive and energy intensive processing equipment would be required to separate the $CO_2$ from the other gases, such as nitrous oxides (NOx). Many of the presently disclosed embodiments of the invention use a high purity oxygen stream to combust hydrocarbons and produce $CO_2$ and water. The water separation is accomplished by simply cooling the products of combustion.

In one exemplary embodiment of the high purity oxygen stream may be utilized to produce inexpensive $CO_2$ and water. Lower purity oxygen has two implications. First, the combustion products based on low purity oxygen become relatively expensive to separate—the extreme being combustion products based on air as the oxidant. This may result in flue gas separation which is prohibitively expensive. Secondly, the lower heat capacity of the resulting flue gas reduces the overall thermodynamic advantage of the disclosed embodiments. The level of oxygen purity required to maximize project economics will vary from project to project. In general, the level of purity required may not be less than 50%. This may be accomplished with air separation processes such as is based on membranes or on cryogenic processes. In particular, one embodiment of the disclosed systems utilizes air separation units (ASUs) based on cryogenic separation or separation utilizing a mole sieve. At the low end of the oxygen purity spectrum for the cryogenic-based ASU is an ASU design optimized for high-purity nitrogen production, resulting in oxygen purity below 70%. This stream may contain nitrogen levels greater than 20%. At the other end of the spectrum is an ASU design optimized for high-purity oxygen production in which even Argon is separated from the oxygen, resulting in oxygen purity close to 100%.

In some embodiments of the present disclosure, the ASU is a cryogenic process for separating nitrogen and oxygen from air. The cost associated with the ASU depends on the desired purity of the products. Producing 99.5% pure oxygen requires a significant increase in capital and horsepower compared to an ASU that produces 95% oxygen. Therefore, the purity of the oxygen that is used in the oxy-fuel combustion should be limited based on the specification of the products of combustion. If a high purity $CO_2$ stream is required then high purity oxygen may be required. If the products of combustion are vented then lower purity oxygen can be utilized.

In one embodiment, the combustion is done at elevated pressure, so that additional power can be produced by expanding the products of combustion across the expander. The efficiency of a Brayton cycle is a function of the pressure ratio across the expander and the inlet temperature to the expander. Therefore, moving to higher-pressure ratios and higher expander inlet temperatures increases gas turbine efficiency. The inlet temperature to the expander may be limited by material considerations and cooling of the part surfaces. In some instances, gas reserves have high wellhead pressures (e.g. from about 1,000 pounds per square inch (psi) to about 6,000 psi) and high concentrations of inert gases, so no boost compressor may be required. Using these types of fuels in a high pressure combustor and then expanding them in the expander section can result in high efficiencies and provide an economical way for utilizing such reserves. Depending on the well head pressure available, the expansion may also be stopped at an elevated pressure to reduce the cost associated with compressing the $CO_2$ for EOR or sequestering. For example, having the expander exhaust a 1 barg (1 bar gage or about 14.5 psig) compared to just a few inches of water of positive pressure can save almost 25% of the compression energy required to get the $CO_2$ to critical conditions (at or above the critical point—about 31° C. and about 73.8 barg or 1,070 psig). Increasing the expander backpressure to 5 barg (about 72.5 psig) saves about 55% of the compression energy and increasing the backpressure to 10 barg (about 145 psig) saves about 70% of the $CO_2$ compression energy.

The combustor utilized could be similar to those used in the gasification process where oxygen and hydrocarbons react in a reducing atmosphere using steam to moderate the temperature. In the present invention, $CO_2$ would be used in place of the steam to moderate the temperature. Using steam is expensive and would also result in the formation of additional hydrogen in the products of combustion which is not desired in the present cycle. By mixing the $CO_2$ with the oxygen, it may also be possible to use a more conventional diffusion type combustor similar to those used in existing gas turbines where $CO_2$ would be used instead of air to cool the combustion liners. Combustion at near stoichiometric conditions (or "slightly rich" combustion) is preferred to eliminate the cost of excess oxygen removal. Commercial technologies are currently available for oxygen removal if leaner combustion is required for flame stability.

Figure 1B:
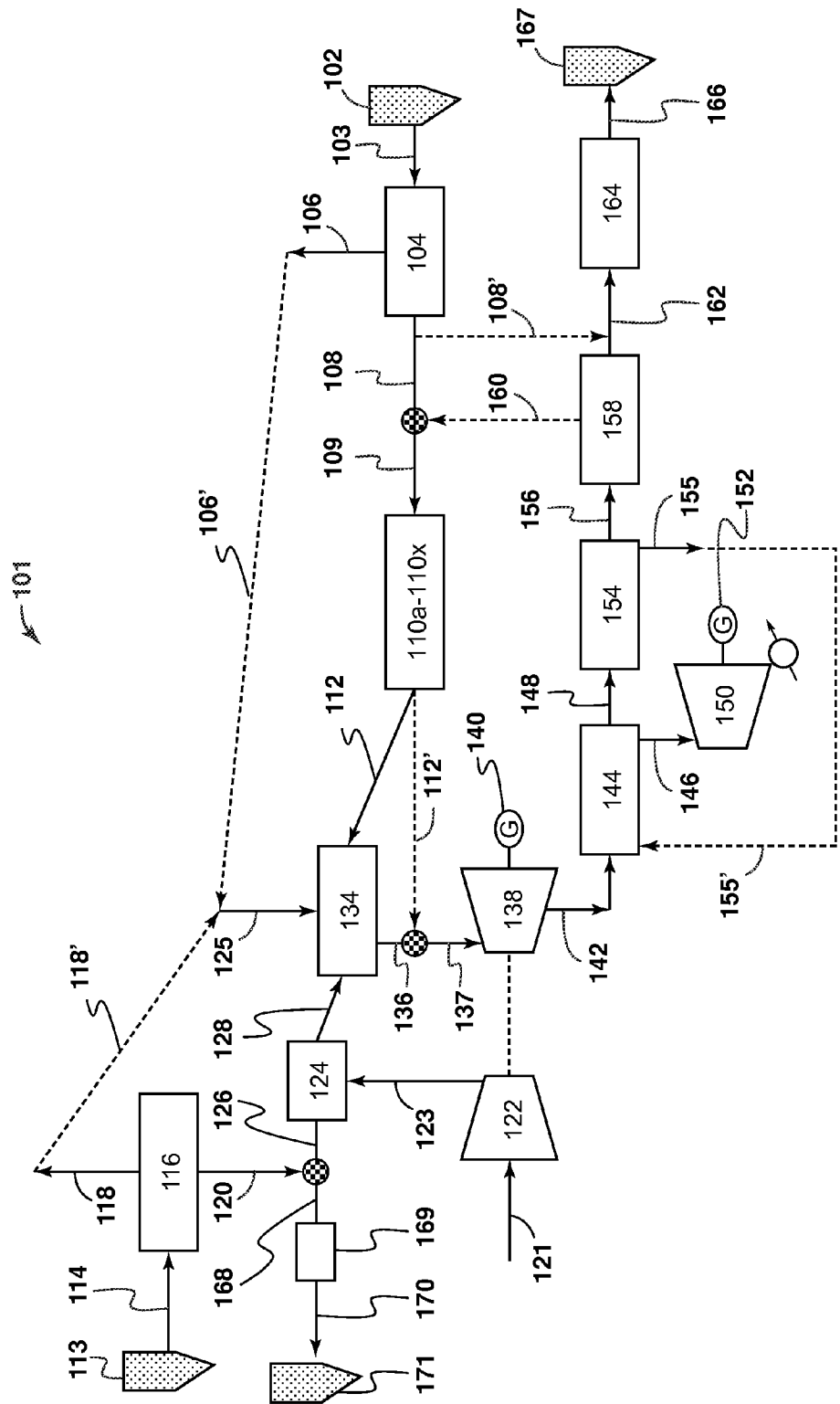

Referring now to the figures, FIGS. 1A-1B illustrate an integrated system for low emission power generation and hydrocarbon recovery of the present invention. In FIG. 1A, the system 100 comprises an air separation unit 124 to produce a high purity oxygen stream 128 and a high purity nitrogen stream 126 from an atmospheric air stream 123, and a gaseous control fuel stream 125. A combustor 134 is also provided, which combusts at least a combination of the oxygen stream 128 and the fuel stream 125 to produce a gaseous combustion stream 136. A power generation system 139 receives the combustion stream 136 and produces water 155, power 140, and a compressed gaseous substantially carbon dioxide stream 162, which is sent to injection compressors 164 to form an injection stream 166 for injection in an enhanced oil recovery reservoir or carbon dioxide sequestration location 167. The nitrogen stream 126 is sent to injection compressor 169 to form injection stream 170 for injection in a pressure maintenance reservoir or a nitrogen storage location 171.

FIG. 1B illustrates an exemplary embodiment of the system 100. The system 101 includes a first hydrocarbon recovery reservoir 102 that produces a first mixed fluid hydrocarbon production stream 103, and includes a separation unit 104, a liquid hydrocarbon product stream 106, a secondary gaseous feed stream 108 comprising some carbon dioxide ($CO_2$) and light hydrocarbons (e.g. methane, ethane, etc.), which may be mixed with a recycle stream 160 to form low energy (e.g. low BTU) stream 109 comprising substantially $CO_2$ (e.g. from about 60 volume percent to about 95 vol %), at least one compression unit 110A-110X, which includes a compressor and may include a cooling unit to compress and cool the low energy stream 109 to provide a first compressed low energy gaseous stream 112. The system 100 further includes a second hydrocarbon recovery reservoir 113 to produce a second mixed fluid hydrocarbon production stream 114, a second separation unit 116, a hydrocarbon product stream 118 and an inert gas feed stream 120 comprising substantially nitrogen ($N_2$) (e.g. from about 70 volume percent to about 100 vol %). The system 100 also includes an air inlet stream 121, which is compressed in compressor 122 to form a compressed air inlet stream 123 feeding an air separation unit 124 to produce a high purity nitrogen stream (e.g. from about 85 vol % to about 100 vol %) 126 and a high purity oxygen stream (e.g. from about 70 vol % to about 100 vol %) 128. The high purity oxygen stream 128 is burned with a gaseous control fuel stream 125 in a combustor 134. The low energy gaseous stream 112 is also introduced into the combustor 134 for temperature control, mass flow, and possibly for partial combustion of a portion of the hydrocarbons in the stream 112.

The combination of the high purity oxygen stream 128 and the gaseous control fuel stream 125 in the combustor 134 is configured to maintain a minimum adiabatic flame temperature and flame stability to combust all or nearly all of the oxygen in the enriched oxygen fuel stream 128 (e.g. a stoichiometric reaction is preferred). In terms of heating value, the oxygen stream 128 has no heating value, the control fuel stream 125 has relatively high value (e.g. from at least 300 British thermal units per standard cubic foot (BTU/scf) to about 900 BTU/scf or from about 500 BTU/scf to about 700 BTU/scf) and the low energy stream 112 has a relatively low heating value (e.g. from about 100 BTU/scf to about 450 BTU/scf or from about 150 BTU/scf to about 300 BTU/scf). Note that where the control fuel stream 125 is pre-mixed with the low energy stream 112, the heating value of the mixed stream may be from about 200 BTU/scf to about 500 BTU/scf. The combustion of the streams 112, 125, and 128 produces a gaseous combustion stream 136, which may be mixed with low energy gas side stream 112' to provide cooling to form an expander inlet stream 137, which is fed to an expander 138 to generate mechanical power 140 and a gaseous exhaust stream 142. Note that the expander 138 may be an expander on a power gas turbine or a hot gas expander.

The gaseous exhaust stream 142 may substantially comprise carbon dioxide and vaporized water and is sent to a heat recovery steam generator (HRSG) 144 or a similar device. The HRSG 144 generates a steam stream 146, which may be sent to a steam turbine 150 to generate additional power 152 and the cooled exhaust gas 148 is sent to a cooling unit 154, which produces a water dropout stream 155 and a substantially carbon dioxide stream 156. The substantially carbon dioxide stream 156 is sent to compressors 158 configured to form a compressed carbon dioxide stream 162, which is sent to well injection compressors 164, where the stream 162 is compressed to form a highly compressed carbon dioxide stream 166 for injection into an enhanced oil recovery (EOR) reservoir 167. Meanwhile, the inert gas feed stream 120 may be mixed with the high purity nitrogen stream 126 to form pressure maintenance stream 168, which may be compressed in compressor 169 to form injection stream 170 for injection into pressure maintenance reservoir or nitrogen storage 171.

Although four reservoirs 101, 113, 167, and 171 are referenced, the reservoirs may all be the same reservoir, be two, three or four different reservoirs, and may include multiple reservoirs for injection or production. Further, the content of the production streams 102 and 114 will likely change over time, particularly at "break-through" where the injected gases begin to be produced.

In general, the EOR reservoir 167 is a reservoir or a portion of a reservoir that comprises substantially liquid hydrocarbons such as crude oil and is generally located over an aquifer. The liquid hydrocarbons are miscible with injected compressed carbon dioxide stream 166 at the proper temperature and pressure. High $CO_2$ concentrations (e.g. up to about 90 volume % or greater) are preferred in such a miscible flooding operation because the $CO_2$ acts as a dilute to lower the viscosity of the oil and as a solvent to remove the oil from the formation rock, and other reasons. In addition, less power is needed to pump the gas 166 into the reservoir if it properly mixes. Oxygen levels in the injection stream 166 are preferably kept very low.

In general, the pressure maintenance reservoir 171 is a reservoir or a portion of a reservoir that includes a gas cap above an oil producing formation. As the liquids are produced, the gas cap pressure and formation pressure is reduced, resulting in lower production and possibly retrograde condensation in the gas portion. The injected gas 170 is configured to maintain the pressure in the reservoir to at least maintain recovery pressure and avoid retrograde condensation. Miscibility is not an issue in such an operation. As such, inert gasses like nitrogen are preferred. In the special, exemplary case where at least the injection reservoirs 167 and 171 are the same, the nitrogen may be injected into the gas cap of the reservoir and the carbon dioxide is used as a miscible injectant for EOR in the same reservoir.

The production streams 103 and 114 may be the same or different or include production from multiple reservoirs and may include any variety of light and heavy liquid and gaseous hydrocarbon components as well as other non-hydrocarbon components such as carbon dioxide, hydrogen sulfide, nitrogen, carbonyl sulfide, and combination thereof. During initial or early stage production, it is expected that there will be significantly more heavy hydrocarbon components than sour or non-hydrocarbon components in the production streams 103 and 114. Exemplary contents of the sweet streams 103 and 114 comprise from at least about 70 mol percent (%) hydrocarbons to about 99 mol % hydrocarbons, from about 1 mol % to about 5 mol % $CO_2$, from about 0 mol % $N_2$ to about 5 mol % $N_2$, and some other components.

As hydrocarbons are produced and particularly once gas breakthrough occurs, the compositions may change drastically. For example, after $CO_2$ breakthrough, an exemplary production stream 103 or 114 may have the following contents: about 5 mol percent (%) hydrocarbons to about 60 mol % hydrocarbons, from about 40 mol % to about 95 mol % $CO_2$, from about 0 mol % $N_2$ to about 10 mol % $N_2$, and some other components. After nitrogen breakthrough, an exemplary production stream 103 or 114 may have the following contents: about 5 mol percent (%) hydrocarbons to about 60 mol % hydrocarbons, from about 5 mol % to about 20 mol % $CO_2$, from about 40 mol % $N_2$ to about 95 mol % $N_2$, and some other components. Note that breakthrough is a transient process rather than a step-wise process resulting in a relatively fast, but gradual increase in the amount of breakthrough gas produced. For example, a reservoir may steadily produce about 5 mol % $CO_2$ during early production, then produce an increasing amount of $CO_2$ during a transition period (from a month to several years) until the $CO_2$ production reaches a high steady state production of about 95 mol % $CO_2$.

The separation units 104 and 116 may be the same unit, different units, or each comprise multiple units in series or parallel depending on the contents of the production streams 103 and 114, respectively. The separation units 104 and 116 may comprise any known technology for hydrocarbon separation, such as, for example: refrigeration, lean oil absorption, adsorption onto a solid sorbent like silica gel, adsorptive kinetic separation, cryogenic separation, or some combination of these processes. Further, once breakthrough occurs, the separation components, facilities, and processes will likely require adjustment, de-bottleneck, or total replacement to account for the differences in production stream contents.

The first and second hydrocarbon product streams 106 and 118 may comprise light and heavy hydrocarbons, such as propane, butane, pentane, hexanes, or aromatics, natural gasoline, and even crude oil. The product streams 106 and 118 are preferably sent downstream for further processing and sale or other utilization, but a portion of the streams 106' and 118' may be utilized in the system 100. After separation, the remaining gaseous streams 108 and 120 will have the contents of the production streams 103 and 114 respectively, but with the heavier hydrocarbons removed by the separation units 104 and 116.

The following table provides exemplary compositions of the gaseous streams 112, 125, 128, 136, 137, and 162 (and molar flow ratios of the incoming streams 112, 125, and 128) for the embodiment of the system 100 in which the substantially carbon dioxide stream 156 is injected into a hydrocarbon recovery reservoir in an enhanced oil recovery operation and after $CO_2$ break-through. The flow ratio for streams 112, 125, and 128 are in volume fractions.

TABLE 1

|  | CO2-rich Fuel (112) | Control Fuel (125) | O2 stream (128) | Combustion Prod (136) | Expander Inlet (137) | Injection Stream (162) |
| --- | --- | --- | --- | --- | --- | --- |
| H2O | 0.0000 | 0.0000 | 0.00000 | 0.2337 | 0.0707 | 0.0000 |
| N2 | 0.0085 | 0.0000 | 0.00000 | 0.0057 | 0.0076 | 0.0082 |
| O2 | 0.0000 | 0.0000 | 0.95587 | 0.0000 | 0.0000 | 0.0000 |
| CO2 | 0.8816 | 0.0000 | 0.00151 | 0.7484 | 0.8413 | 0.9053 |
| C1 | 0.0521 | 1.0000 | 0.00000 | 0.0001 | 0.0363 | 0.0391 |
| C2 | 0.0276 | 0.0000 | 0.00000 | 0.0000 | 0.0192 | 0.0207 |
| C3 | 0.0125 | 0.0000 | 0.00000 | 0.0000 | 0.0087 | 0.0093 |
| iC4 | 0.0040 | 0.0000 | 0.00000 | 0.0000 | 0.0028 | 0.0030 |
| nC4 | 0.0059 | 0.0000 | 0.00000 | 0.0000 | 0.0041 | 0.0044 |
| iC5 | 0.0036 | 0.0000 | 0.00000 | 0.0000 | 0.0025 | 0.0027 |
| nC5 | 0.0011 | 0.0000 | 0.00000 | 0.0000 | 0.0008 | 0.0009 |
| C6 | 0.0032 | 0.0000 | 0.00000 | 0.0000 | 0.0022 | 0.0024 |
| Ar | 0.0000 | 0.0000 | 0.04262 | 0.0122 | 0.0037 | 0.0040 |
| Flow ratio | 775.6 | 1.0 | 74.4 |  |  |  |

In some embodiments where the initial gaseous stream 103 or 108 is at a high enough pressure, the compressors 110A-110X may not be needed. In other embodiments, the compressors 110A-110X may include from one to four centrifugal compressors 110A-110D, which may include intercoolers between them, there may be a single axial compressor 110, or some combination depending on system requirements and economics. As noted, higher pressures in the combustor 134 and expander 138 may improve overall efficiency of the system 101. For example, the expander exhaust 142 may be from about 1 barg to about 10 barg or about 4 barg to about 6 barg or about 5 barg. It is contemplated that a person of ordinary skill in the art has been provided with sufficient information to engineer the compressors 110A-110X, the combustor 134, and the expander 134 to obtain a higher pressure expander exhaust in accordance with the present disclosure.

In additional embodiments, it may be desirable to keep the stream 112 at higher temperatures for mixing and combustion in the combustor 134. Stream 112 may be heated by cross-exchange with hot exhaust gas stream 136 or 142 (if stream 142 is used, it may be compressed prior to the cross exchange), heat generated by one of the other compressors in the system 100 (e.g. compressor 122, compressor 158, or compressor 164), or the HRSG 144. A temperature sufficient to improve the efficiency of combustion in the combustor 134 is preferred. In one embodiment, the sour gas stream 112 may be from about 50 degrees Celsius (° C.) to about 500° C. upon entering the combustor 134.

The combustor 134 may be a standard external combustor or may be a customized or modified combustor. Examples of applicable combustor types include an oxyClaus burner, a partial oxidation (POX) burner, auto-thermal reforming (ATR) burner, diffusion burners, lean-premix combustors, and piloted combustors. Note that each burner type may require some modification to work with a substantially $CO_2$ stream. In the diffusion flame combustor (or "burner") the fuel and the oxidant mix and combustion takes place simultaneously in the primary combustion zone. Diffusion combustors generate regions of near-stoichiometric fuel/air mixtures where the temperatures are very high. In pre-mix combustors, fuel and air are thoroughly mixed in an initial stage resulting in a uniform, lean, unburned fuel/air mixture that is delivered to a secondary stage where the combustion reaction takes place. Lean-premix combustors are now common in gas turbines due to lower flame temperatures, which produces lower NOx emissions. In the piloted combustor a hot flamed pilot ensures that the lean fuel oxidant mixture surrounding it maintains stable combustion. These piloted combustors are typically used in aircraft engines and for fuels that may not be able to maintain stable combustion on their own.

Figure 2:
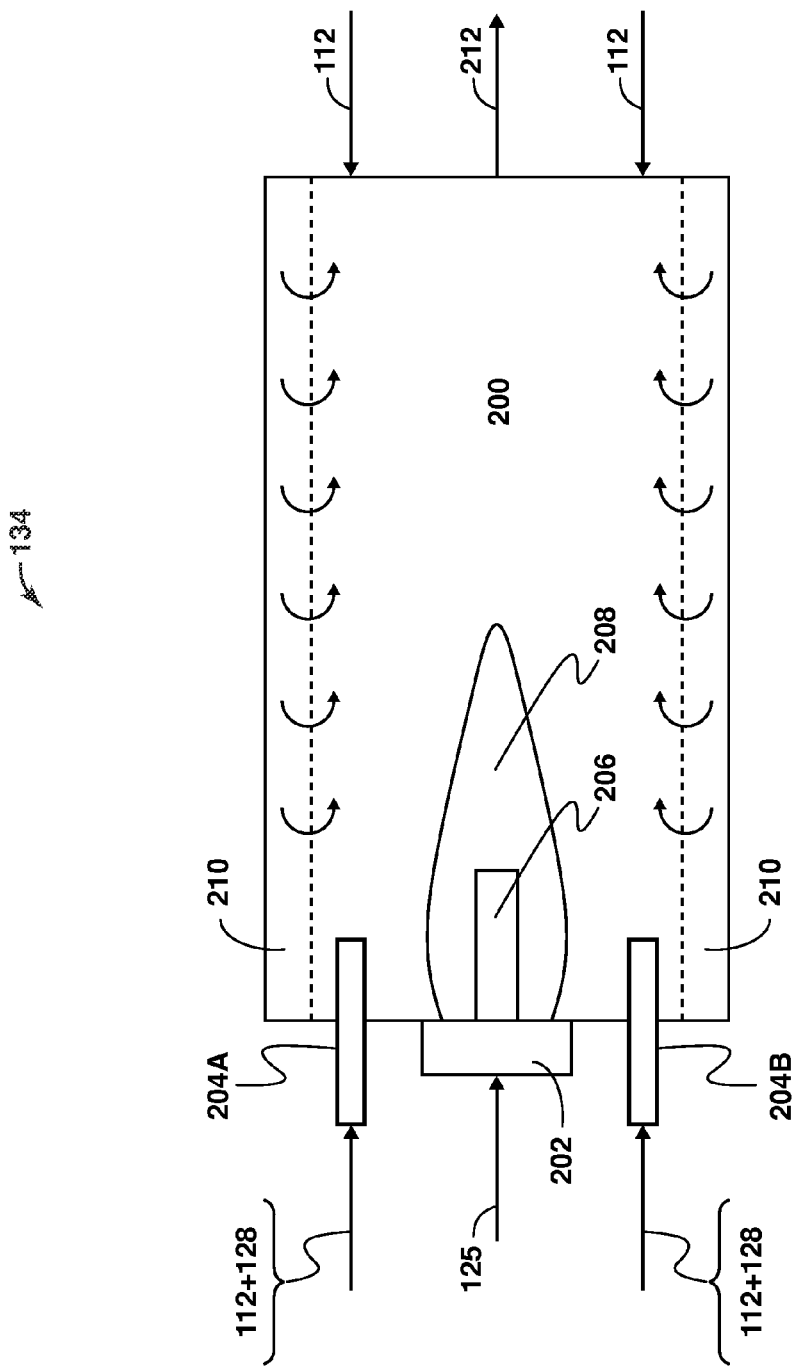
FIG. 2 illustrates a schematic of an exemplary combustor as it might be configured for use in the system of FIGS. 1A-1B.

FIG. 2 illustrates a schematic of an exemplary combustor 134 as it might be configured for use in the system 100. As such, FIG. 2 may be best understood with reference to FIGS. 1A-1B. This embodiment of the combustor 134 may be referred to as an "oxygen combustor" and includes a combustion chamber 200, a gas mixing chamber (or atomizer) 202, a burner nozzle 206, secondary gas inlets 204A-204B and an outer wall (or shroud) 210.

In one exemplary embodiment, the atomizer 202 and nozzles 204A-204B and 206 may be configured to mix the natural gas stream 125 with an oxidizing stream comprising the sour gas stream 112 and the high purity oxygen stream 128 in a highly turbulent manner to ensure a homogeneous mixture is achieved. During operation, the flame 208 produces temperatures up to about 2,200° C. With the addition of the cooling gas 112, the exhaust gas 212 is expected to be up to about 1,400° C. Additional cooling gas 112 may be introduced via the outer wall 210 generating a sort of "gas envelope" to keep the wall of the chamber 200 notably cooler than the flame 208. In one exemplary embodiment, the cooling stream 112 may be stripped of hydrocarbons to minimize soot formation, if necessary. In another exemplary embodiment, the combustion takes place at higher than atmospheric pressure. The reaction generates water (vapor) and carbon dioxide as shown by the equations below (the carbon dioxide entering the chamber generally remains unreacted):

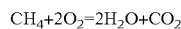

The combustion process is characterized by a high fuel to oxidizer ratio, far beyond the stoichiometric ratio resulting in an ultra rich combustion process. Control of the combustion reaction may be accomplished by accurately metering the oxygen 128 and natural gas 125 to the combustor 134. Temperature is also used to update the fuel and oxygen flow control. In a preferred embodiment including EOR, the fuel 125 and oxygen 128 is metered to produce just below a stoichiometric mixture, preferably on the rich side to avoid as much oxygen as possible in the resulting stream 136. Feedback control based on the products of combustion may be used to update the fuel and oxygen ratios.

A typical partial oxidation (POX) burner mixes natural gas 125 with a steam oxidizing stream 146 in a homogeneous mixture. The addition of steam is not only to moderate the reaction temperature but also to produce additional hydrogen in the reaction. The partial oxidation process is characterized by a high fuel to oxidizer ratio, far beyond the stoichiometric ratio. POX is an example of an ultra rich combustion process.

A typical oxyClaus burner (not shown) comprises multiple sour gas burners surrounding a central start-up burner muffle. Each sour gas burner would include a feed or "lance" from the oxygen stream 128, the low energy stream 112, and the control fuel stream 125. Temperatures could be up to about 2,200° C. (about 1,900 K) or even higher. The combined feed streams 128, 112, and 125 may form a very hot oxygen flame surrounded by a cooler envelope of gas, such as from control stream 112'.

In a typical thermal auto-thermal reforming (ATR) process (not shown) a mixture of natural gas-steam (e.g. 125 and 146) and oxygen 128 is fed to the combustor 134. Partial oxidation reactions occur in a combustion zone and then the products pass through a catalyst bed, where reforming reactions occur. The ATR reactor consists of a refractory lined pressure vessel with a burner, a combustion chamber and a catalyst bed. It has a design similar to that of the POX reactor, but also contains a catalyst bed. The produced syngas temperature is about 1,300 Kelvin (K) as compared to 1,650 K for the POX reactor. This reduction in the syngas temperature is important because the catalyst does not support higher temperature values. ATR can produce significantly higher $H_2$ to CO ratios in the syngas and is also a soot free operation.

In a typical diffusion burner arrangement (not shown), the fuel and oxidant (a diluted mixture of less than about 30 volume percent (vol %) oxygen 128 and substantially pure carbon dioxide) are mixed in a very turbulent manner to get a homogeneous mixture and promote complete combustion. The present system 100 would use substantially pure $CO_2$ to dilute the oxidant and provide temperature control. Although the low energy gas stream 112 may be sufficiently pure, it would likely require more cleanup via a mole sieve, membrane, or other process (not shown) prior to use as a dilute in this type of system. The external combustor 134 can be sized to provide the residence time required for the combustion to go to completion and result in the low oxygen levels required for the EOR application.

Figure 3:
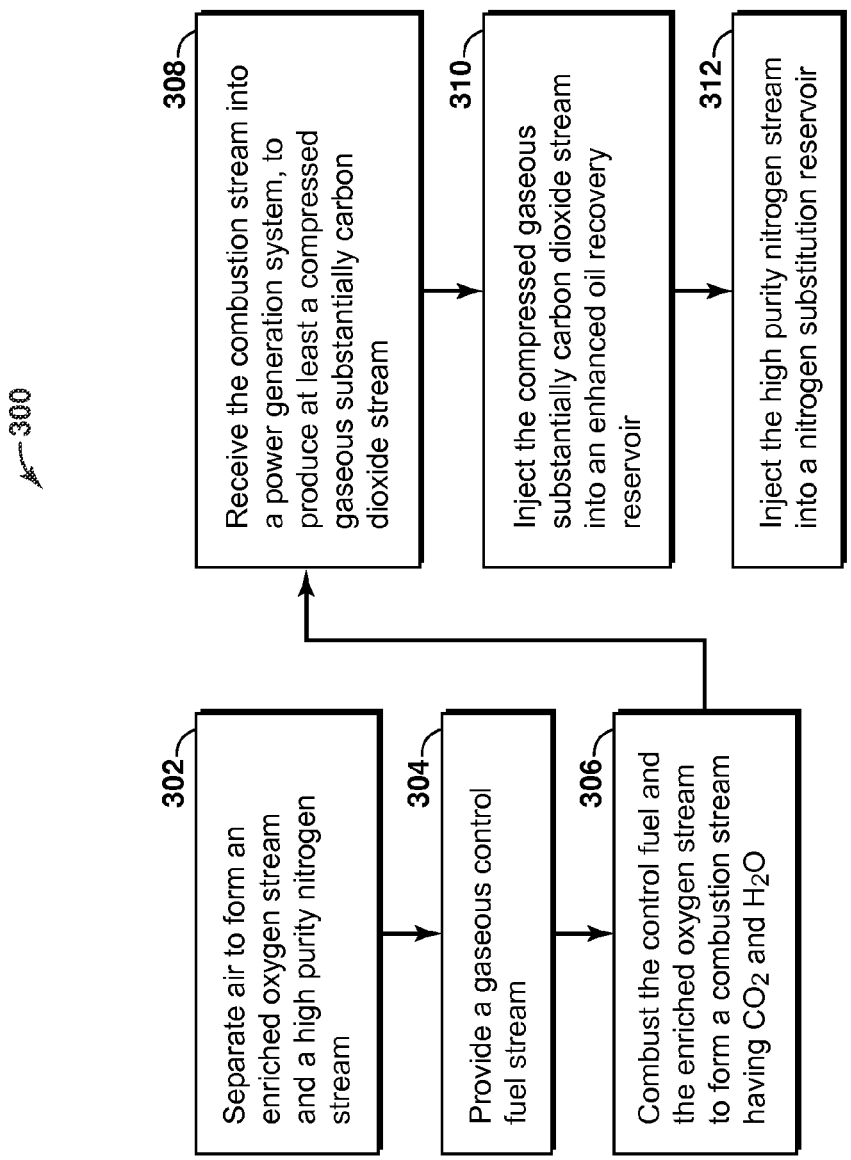
FIG. 3 is an exemplary flow chart of a method of operating the system of FIGS. 1A-1B.

FIG. 3 is an exemplary flow chart of a method of producing hydrocarbons in an efficient, low emission system like the one shown in FIGS. 1A-1B. As such, FIG. 3 may be best understood with reference to FIGS. 1A-1B. The method 300 includes separating air to form an high purity oxygen stream and a high purity nitrogen stream 302, providing a gaseous control fuel stream 304, combusting the control fuel and the high purity oxygen stream to form a combustion stream having $CO_2$ and $H_2O$ 306, receiving the combustion stream into a power generation system to produce at least a compressed gaseous substantially carbon dioxide stream 308, injecting the compressed gaseous substantially carbon dioxide stream into an enhanced oil recovery reservoir 310, and injecting the high purity nitrogen stream into an enhanced nitrogen substitution reservoir 312.

Multiple alternative embodiments of the present invention are possible, some of which are described in more detail herein, others of which should be apparent to one of skill in the art. In one alternative embodiment, the water stream 155 may be routed to the HRSG 144 via line 155' to generate more steam 146. In another alternative embodiment, the gaseous control fuel stream 125 is comprised at least partially of hydrocarbon stream 118', a derivative stream of hydrocarbon stream 118. Such a configuration provides another integration synergy and may lower the overall operating cost of the system 100. A further alternative embodiment includes taking a slip stream 108' from the low energy stream 109 to provide $CO_2$ to the injection compressors 164 for EOR. Such an approach may allow EOR early in a process before other elements of the system 100 are in place, or may simply allow balancing of the various streams 109 and 162 depending on the requirements of the system 100.

In another alternative embodiment, stream 108 may be routed directly to the combustor 134 or the gaseous control fuel stream 125 to pre-mix therewith for safety or control reasons. In the pre-mix configuration, the carbon dioxide recycle stream 160 may be substantially hydrocarbon free such that stream 160 may be usable as a temperature control diluent in the combustor 134.

In another alternative embodiment, all or a portion of the compressed carbon dioxide stream 160 is recycled to the low energy stream 109. This particular embodiment may be useful early in the operation of the system 100, for example, before EOR activities are needed. In such a case, it may be beneficial to provide additional quantities of $CO_2$ to the combustor 134 for temperature control and mass flow control purposes to generate more power 140 for sale or use. In particular, if there is little or no EOR activity, power is not needed for the compressors 164, which frees up the low emission generated power 140 for sale or another purpose. This alternative power cycle may also be beneficial for producing large quantities of $CO_2$ for sale or simply accumulating or sequestering the $CO_2$ until needed for EOR or other purposes.

The following table provides exemplary compositions of the gaseous streams 112, 125, 128, 136, 137, and 160 (and molar flow ratios of the incoming streams 112, 125, and 128) for the alternative recycle case in which the substantially carbon dioxide stream 156 is recycled to the combustor 134 via line 160.

As should be apparent from the table, the complete recycle embodiment of the system 100 results in slightly higher $CO_2$ concentration than the full injection case set forth in Table 1 above and also includes a higher molar flow rate resulting in the production of notably more $CO_2$ than in the injection case.

Combustion stability is an important aspect of the present invention. Although there are many possible approaches to providing stable combustion at stoichiometric or near stoichiometric conditions, many of these approaches are limited or technically infeasible. Preheating the gaseous control fuel stream 125 and low energy streams 112 and 112' and controlling the oxygen 128 and $CO_2$ mixture concentration are all likely approaches to ensuring combustion stability. One possible embodiment of the system 100 includes redirecting a portion of the gaseous exhaust stream 142 or the gaseous combustion stream 136 to heat the streams 125, 112, and 112'.

Some alternative combustion options include adding hydrogen to the gaseous control fuel stream 125 or the low energy gaseous stream 112 as disclosed in U.S. Pat. No. 6,298,652. It may also be economical to add heavier hydrocarbons ($C_2$+) to the gaseous control fuel stream 125 or the low energy gaseous stream 112 to ensure combustion stability. These heavier hydrocarbons may be purchased separately or may be provided via line 118'. Adding such fuels may require additional clean up facilities, so the economics of such an approach should be carefully considered.

In still another alternative embodiment, the heat recovery in the HRSG 144 may occur at elevated pressure. In such a process, the volume of the gaseous exhaust stream 142 can be significantly reduced and the water condenses out at a higher temperature; this makes the removal of the water easier to accomplish and the heat of condensation available at a higher temperature which is more valuable for power generation 152 or desalination (not shown).

Figure 4:
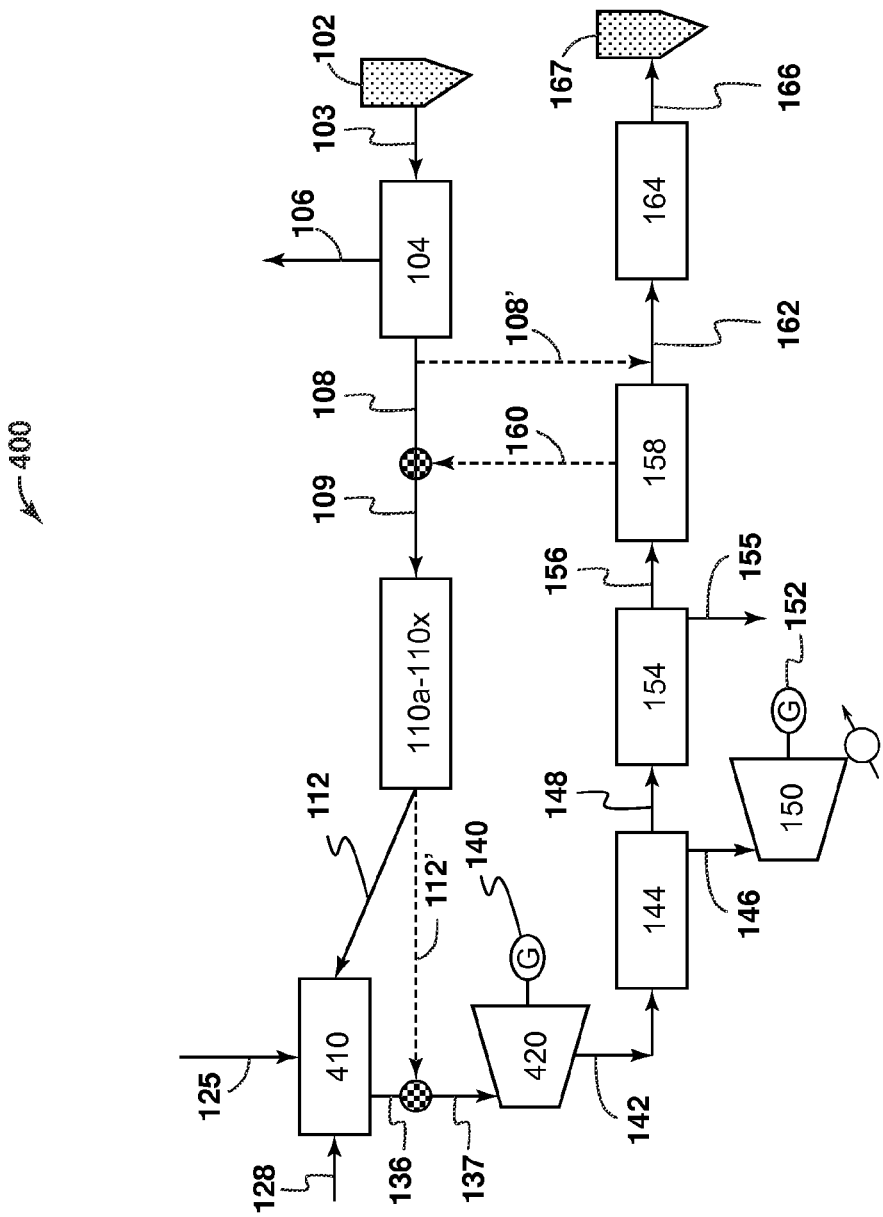
FIG. 4 is an illustration of another embodiment of the low emission power generation system of FIGS. 1A-1B.

FIG. 4 is an illustration of another embodiment of the low emission power generation system of FIGS. 1A-1B. As such, FIG. 4 may be best understood with reference to FIGS. 1A-1B. The system 400 includes a hydrocarbon recovery reservoir 102 that produces a first mixed fluid hydrocarbon production stream 103, and includes a separation unit 104, a liquid hydrocarbon product stream 106, a secondary gaseous feed stream 108 comprising some $CO_2$ and light hydrocarbons, which may be mixed with a recycle stream 160 to form low energy stream 109 comprising substantially $CO_2$, at least one compression unit 110A-110X, which includes a compressor and may include a cooling unit to compress and cool the low energy gaseous feed stream 109 to provide a first compressed low energy gaseous stream 112. The system 400

TABLE 2

|  | Recycle Stream (160) | Fuel (125) | O2 stream (128) | Combustion Prod (136) | Expander Inlet (137) | Recycle Stream (160) |
|---|---|---|---|---|---|---|
| H2O | 0.00000 | 0.0000 | 0.00000 | 0.2326 | 0.08043 | 0.00000 |
| N2 | 0.00000 | 0.0000 | 0.00000 | 0.0000 | 0.00000 | 0.00000 |
| O2 | 0.00000 | 0.0000 | 0.95587 | 0.0000 | 0.00000 | 0.00000 |
| CO2 | 0.91840 | 0.0000 | 0.00151 | 0.7047 | 0.84453 | 0.91840 |
| C1 | 0.00005 | 1.0000 | 0.00000 | 0.0001 | 0.00005 | 0.00005 |
| C2 | 0.00000 | 0.0000 | 0.00000 | 0.0001 | 0.00000 | 0.00000 |
| C3 | 0.00000 | 0.0000 | 0.00000 | 0.0000 | 0.00000 | 0.00000 |
| iC4 | 0.00000 | 0.0000 | 0.00000 | 0.0000 | 0.00000 | 0.00000 |
| nC4 | 0.00000 | 0.0000 | 0.00000 | 0.0000 | 0.00000 | 0.00000 |
| iC5 | 0.00000 | 0.0000 | 0.00000 | 0.0000 | 0.00000 | 0.00000 |
| nC5 | 0.00000 | 0.0000 | 0.00000 | 0.0000 | 0.00000 | 0.00000 |
| C6 | 0.00000 | 0.0000 | 0.00000 | 0.0000 | 0.00000 | 0.00000 |
| Ar | 0.08155 | 0.0000 | 0.04262 | 0.0626 | 0.07499 | 0.08155 |
| Flow ratio | 21.8 | 1.0 | 2.1 | | | | further includes an external combustor 410 to combine and combust a high purity oxygen stream 128 and a control fuel stream 125 with the compressed low energy gas stream 112 to produce a gaseous combustion stream 136, which may be mixed with a compressed low energy side stream 112' to form expander inlet stream 137. A hot gas expander 420 is provided, which receives the expander inlet stream 137 to produce power 140 and an expanded exhaust stream 142, which may be sent to an HRSG 144 to generate steam 146 and power 152 via steam turbine 150. After steam generation, the stream 148 may be sent to a cooling unit 154 to condense and drop out the water component 155 to form substantially carbon dioxide stream 156, which is sent to a $CO_2$ compressor 158, then recycled via line 160 or sent to an injection compressor 164 via line 162 for injection into EOR reservoir 167. Note that a portion of stream 156 may be recycled while the remainder is injected.

The hot gas expander 420 may be a commercially available unit, such as the FEX-125 or similar model from General Electric. However, the expander 420 may also be a slightly modified unit to handle the substantially $CO_2$ fluid 136 at the expected temperatures and pressures. In one exemplary embodiment, a plurality of hot gas expanders 420A-420X would be aligned in parallel. Although some modification is expected, the high pressure hot gas expander 420 is a more robust device than an integrated gas power turbine. For example, using a substantially $CO_2$ working fluid 136 in a gas power turbine poses difficult and unsolved thermodynamic and operational issues that may require a ground-up turbine re-design. See, e.g. U.S. Pat. App. No. 2007/0237696 and SNARHEIM, DAGFINN, ET AL., *Control Design for a Gas Turbine Cycle with $CO_2$ Capture Capabilities*, $16^{th}$ IFAC World Congress, Prague, Czech Rep., July 2005. A hot gas expander, however, does not have the complexity of the gas power turbine. The use of a hot gas expander results in increased degrees of freedom to optimize the system for improved performance. For example, the operating pressure may be elevated for increased thermodynamic efficiency of the Brayton power cycle. For these and other reasons, the hot gas expander 420 may be more suitable to run on the substantially $CO_2$ working fluid exhaust gas 136 or 137 than a gas power turbine and may not require a new design.

Figure 5:
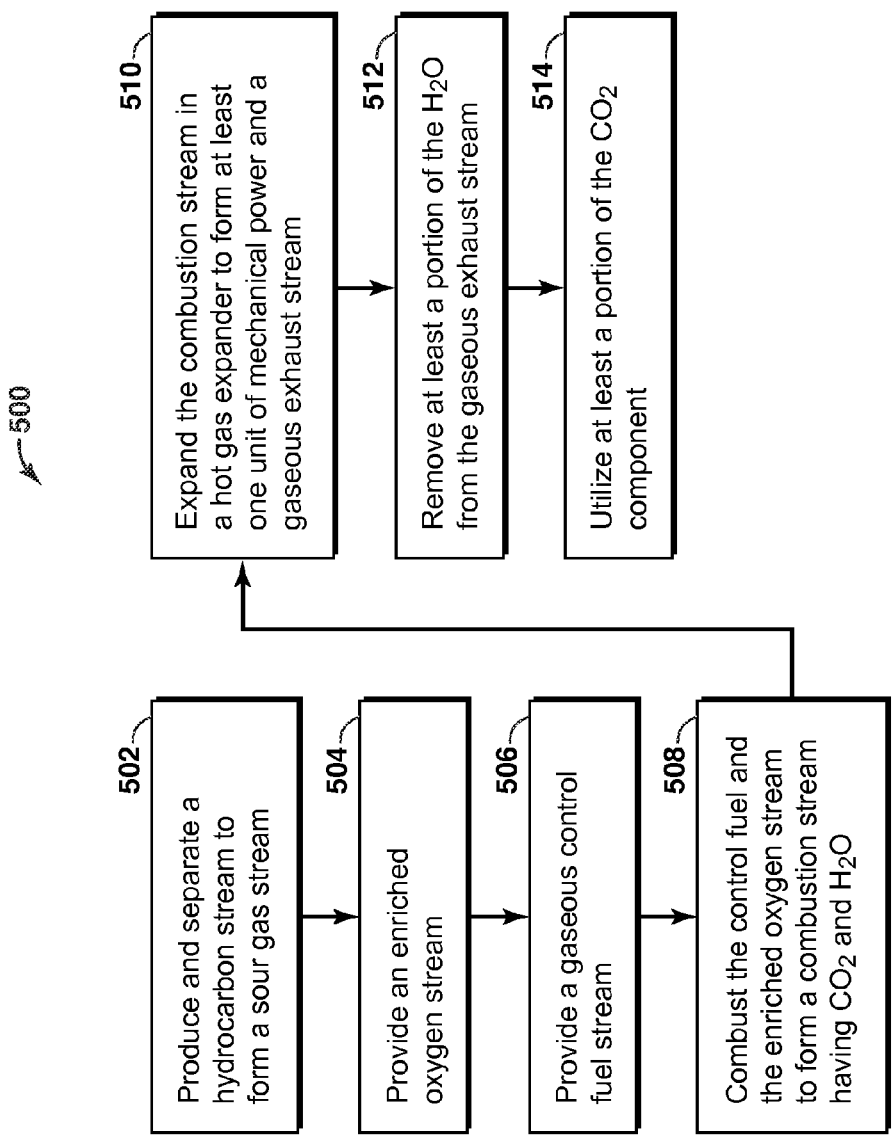
FIG. 5 is an exemplary flow chart of a method of operating the system of FIG. 4.

FIG. 5 is an exemplary method of operating the system of FIG. 4. As such, FIG. 5 may be best understood with reference to FIGS. 1A-1B and 4. The process 500 includes producing and separating 502 a hydrocarbon stream 102 to form a compressed low energy gas stream 112, providing 504 a high purity oxygen stream 128, providing 506 a gaseous control fuel stream 125, combusting 508, in an external combustor 410, a combination of at least the high purity oxygen stream 128 and the gaseous control fuel stream 125 to produce a gaseous combustion stream 136 having carbon dioxide and water, expanding 510 the gaseous combustion stream 136 or 137 in a hot gas expander 420 to produce at least one unit of mechanical power 140 and a gaseous exhaust stream 142, removing 512 at least a portion of the water component 155 from the gaseous exhaust stream 148, and utilizing 514 at least a portion of the resulting carbon dioxide component 156.

Figure 6:
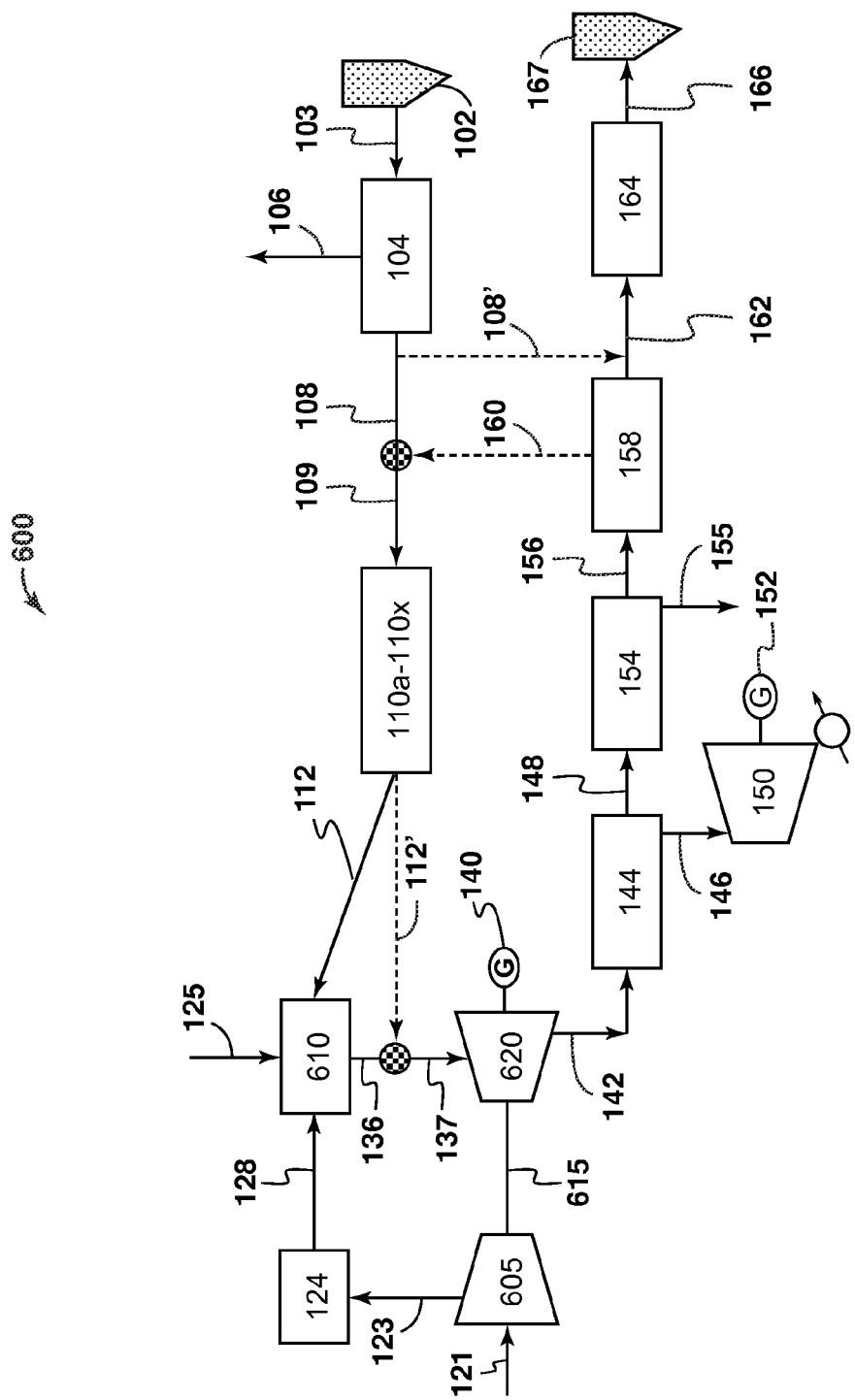
FIG. 6 is an illustration of yet another embodiment of the low emission power generation system of FIGS. 1A-1B.

FIG. 6 is an illustration of another embodiment of the low emission power generation system of FIG. 4. As such, FIG. 6 may be best understood with reference to FIGS. 1A-1B and 4. The system 600 includes many of the same components as the systems 100, 101 and 400. However, system 600 utilizes a gas power turbine 620 in place of the hot gas expander 420. The turbine inlet compressor 605 is configured to receive atmospheric air 121, is connected to the expander 620 by a shaft or similar mechanism 605 and includes a combustor 610.

In such a system 600, the gas power turbine would still utilize the compressed low energy gas stream 112 as working fluid to cool the system because the compressed air 123 from the inlet compressor 605 is utilized in the air separation unit 124. In one particular embodiment, the volumetric flow of the compressed air stream 123 would produce a high purity oxygen stream 128 that substantially matches the amount of oxygen needed for a stoichiometric reaction in the combustor 134.

Figure 7:
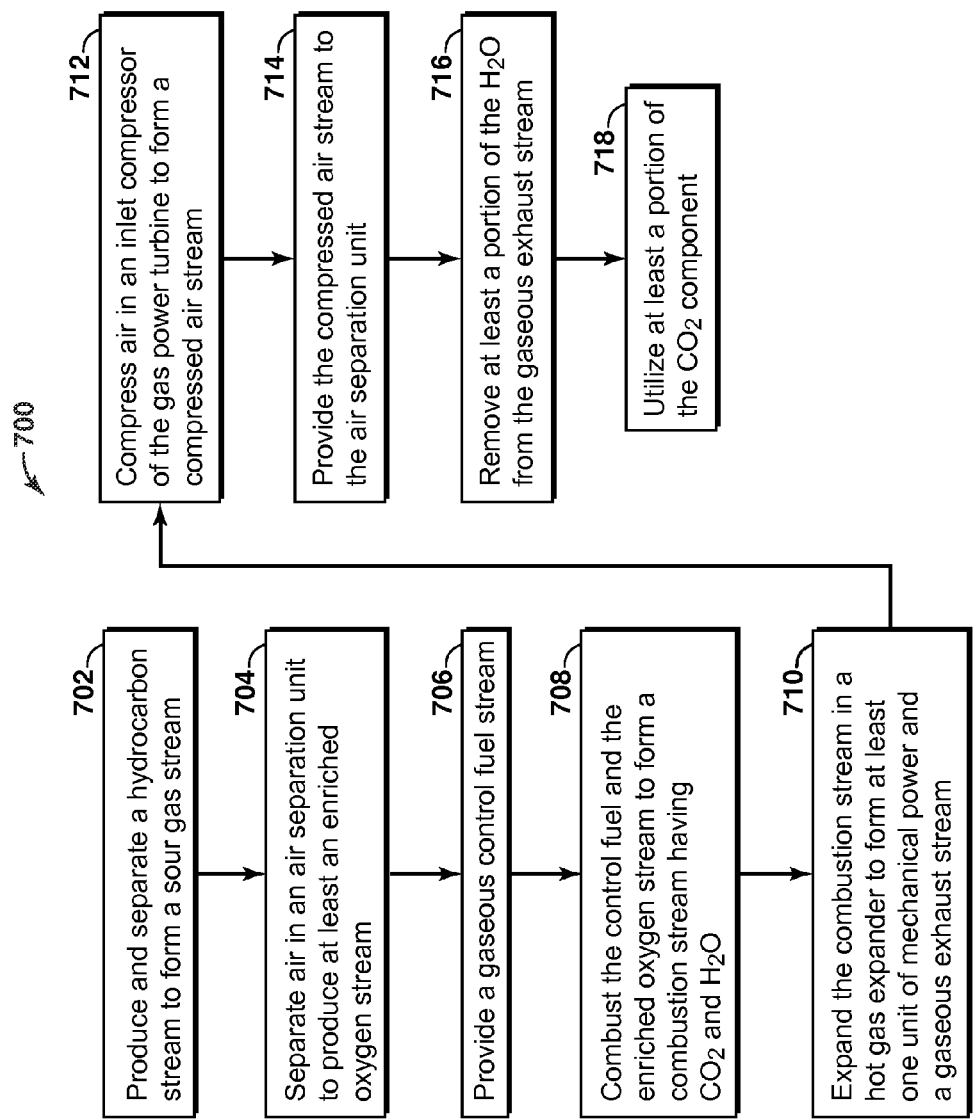
FIG. 7 is an exemplary flow chart of a method of operating the system of FIG. 6.

FIG. 7 is an exemplary method of operating the system of FIG. 6. As such, FIG. 7 may be best understood with reference to FIGS. 1A-1B and 6. The process 700 includes producing and separating 702 a hydrocarbon stream 102 to form a compressed low energy gas stream 112, separating air 704 in an air separation unit 124 configured to produce at least an high purity oxygen stream 128, providing 706 a gaseous control fuel stream 125, combusting 708, in a combustor 610, a combination of at least the high purity oxygen stream 128 and the gaseous control fuel stream 125 to produce a gaseous combustion stream 136 having carbon dioxide and water, expanding 710 the gaseous combustion stream 136 or 137 in an expander of the gas turbine 620 to produce at least one unit of mechanical power 140 and a gaseous exhaust stream 142, compressing air 712 in an inlet compressor of the gas power turbine 605 to form a compressed air stream 123, providing 714 the compressed air stream 123 to the air separation unit 124, removing 716 at least a portion of the water component 155 from the gaseous exhaust stream 148, and utilizing 718 at least a portion of the resulting carbon dioxide component 156.

Figure 8A:
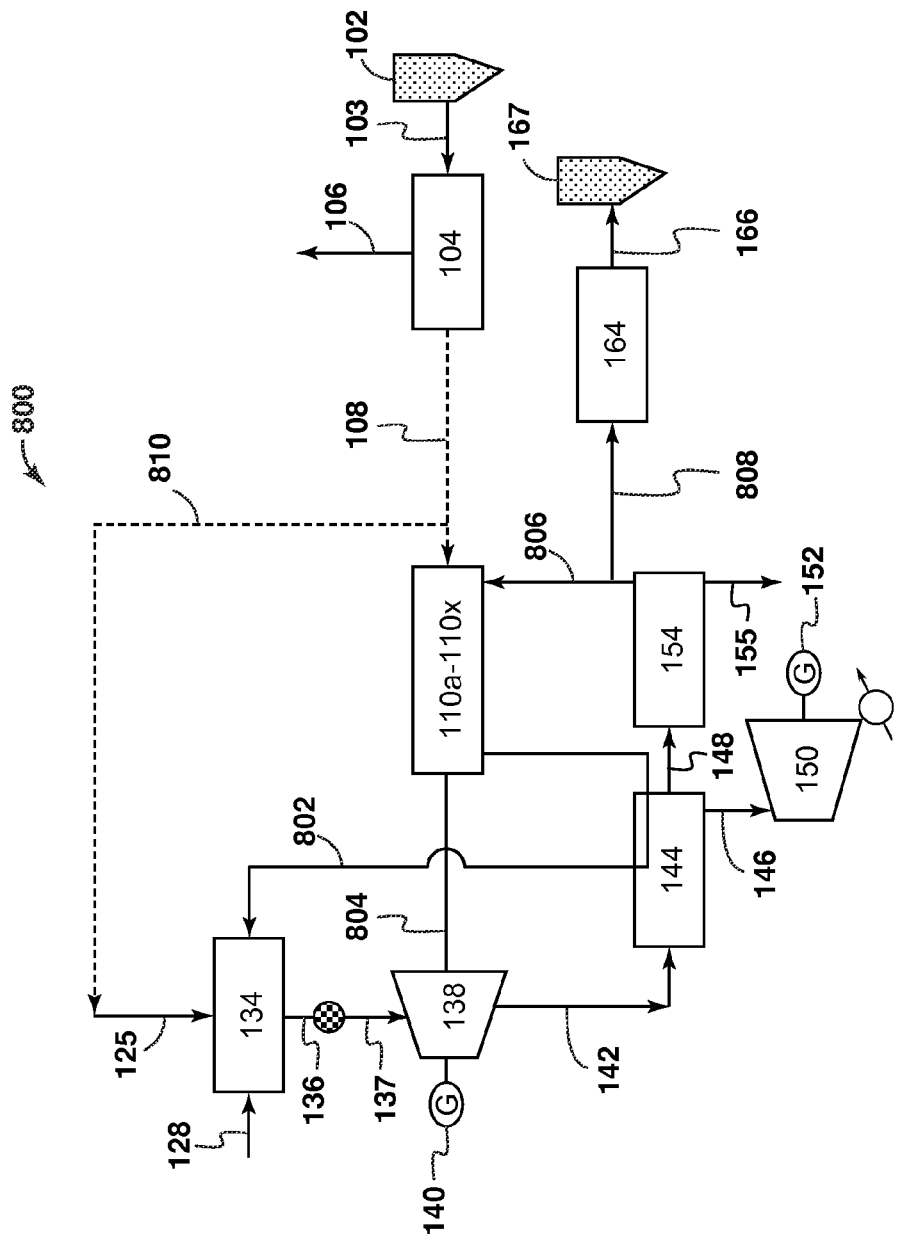
FIGS. 8A-8C are illustrations of additional alternative embodiments of the low emission power generation system of FIGS. 1A-1B.
Figure 8B:
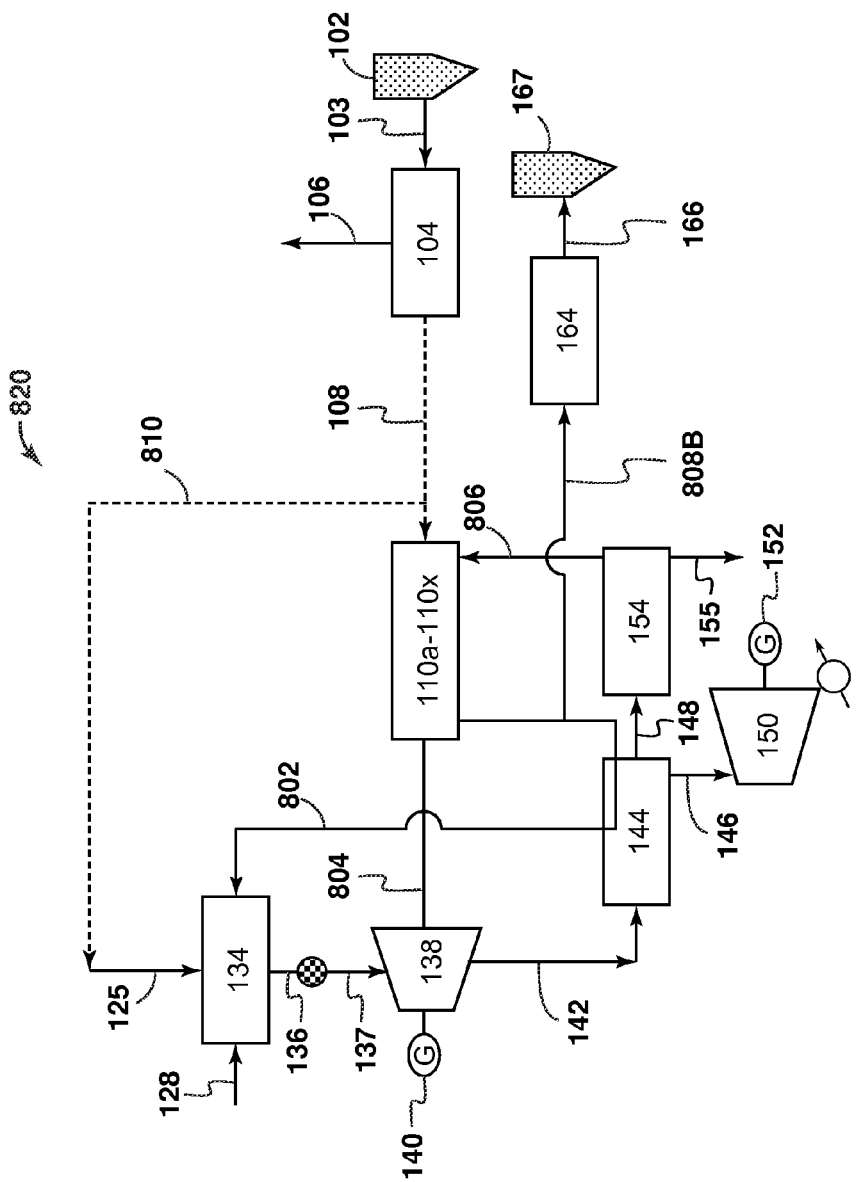
Figure 8C:
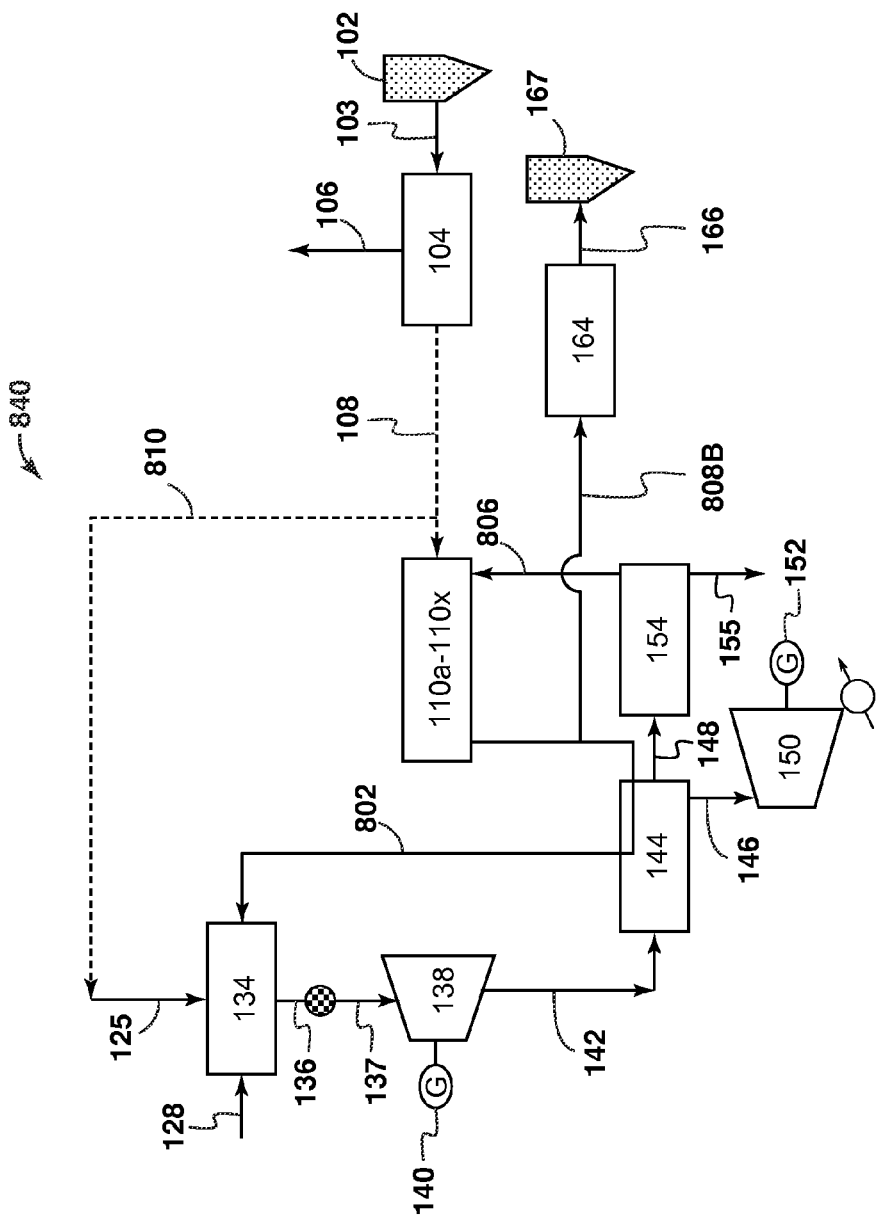

FIGS. 8A-8C are illustrations of additional alternative embodiments of the low emission power generation system of FIGS. 1A-1B. As such, FIGS. 8A-8C may be best understood with reference to FIGS. 1A-1B. FIG. 8A illustrates a system 800 for producing hydrocarbons in which a compressed low energy gas stream 802 from compressors 110a-110x may be routed by the HRSG 144 to thermally condition (e.g. cool) the low energy gas stream 802 prior to mixing and combusting in combustor 134. The system 800 further includes a shaft 804 between the compressors 110a-110x and the expander 138 to form a power turbine. Additionally, cooling unit 154 produces a substantially carbon dioxide stream 806, which may be at least partially recycled to compressors 110a-110x and/or diverted to stream 808 to compressors 164 for injection and/or sequestration, storage, or venting. Once a recycle loop is established via line 806, line 108 may not be necessary, except for makeup low value fuel amounts. In yet another alternative embodiment, line 108 may be diverted directly to the combustor 134 as a diluent or to line 125 to pre-mix the gaseous streams 108 and 125 prior to combustion. FIG. 8B illustrates a system 820 that is very similar to system 800, except that substantially carbon dioxide stream 808B is diverted from stream 802. FIG. 8C illustrates a system 840 that is very similar to system 820, except that it does not integrate the compressors 110a-110x with expander 138 via shaft 804.

It is preferable to avoid expensive and energy intensive $CO_2$ separation equipment in any of the systems 100, 101, 400, 600, 800, 820, or 840. To accomplish this goal, the purity of the oxygen stream 128 may be sufficient to limit the presence of impurities to avoid additional separation equipment or processes.

In some embodiments, at least a portion of the systems 100, 101, 400, 600, 800, 820, or 840 may be located on an offshore barge or platform. In such a system, the power may be utilized offshore or onshore and at least one of the reservoirs 113, 171, 102, and 167 may also be located in an offshore location.

In some embodiments of the disclosed systems and methods, fuel contaminates may also be considered. Only fuels that produce byproducts that can meet the EOR specification or fuels that are at a significantly high enough economic advantage so that the processing equipment to remove them can be justified should be considered.

Where a market exists for Argon, the additional cost, power, and complexity for its separation in the ASU 124 may be justified.

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

What is claimed is:

1. An integrated system, comprising:
an air separation unit configured to produce an oxygen stream and a nitrogen stream;
a gaseous control fuel stream;
a combustion unit configured to combust at least the gaseous control fuel stream and the oxygen stream to produce a gaseous combustion stream having carbon dioxide and water;
a power generation system configured to receive the gaseous combustion stream having carbon dioxide and water and produce at least a compressed gaseous carbon dioxide stream comprising from about 60 volume percent (vol %) carbon dioxide to about 95 vol % carbon dioxide;
a first injector unit configured to inject at least a portion of the compressed gaseous carbon dioxide stream into an enhanced oil recovery reservoir;
a second injector unit configured to inject at least a portion of the nitrogen stream into a pressure maintenance reservoir;
a first hydrocarbon recovery reservoir configured to produce a first hydrocarbon mixture; and
a first hydrocarbon separation unit configured to separate at least liquid hydrocarbons from the first hydrocarbon mixture and produce a first hydrocarbon stream and a secondary gas stream comprising carbon dioxide and hydrocarbons, wherein the combustion unit is further configured to utilize at least a portion of the secondary gas stream with the gaseous control fuel stream and the oxygen stream to produce the gaseous combustion stream having carbon dioxide and water.

2. The system of claim 1, wherein the power generation system comprises:
an expander configured to receive the gaseous combustion stream and produce mechanical power and a gaseous exhaust stream;
a heat recovery unit configured to receive and cool the gaseous exhaust stream, produce heat energy, and generate at least a volume of water and a cooled gaseous carbon dioxide stream, wherein the heat energy is optionally utilized to generate steam to generate steam power; and
a carbon dioxide compressor configured to compress the cooled gaseous carbon dioxide stream to produce the compressed gaseous carbon dioxide stream.

3. The system of claim 1, further comprising:
a second hydrocarbon recovery reservoir configured to produce a second hydrocarbon mixture; and
a second hydrocarbon separation unit configured to separate at least liquid hydrocarbons from the second hydrocarbon mixture and produce a second hydrocarbon stream and an inert gas stream comprising nitrogen, wherein the second injector is further configured to inject the inert gas stream into the pressure maintenance reservoir.

4. The system of claim 3, wherein the enhanced oil recovery reservoir is selected from the group consisting of: the first hydrocarbon recovery reservoir, the second hydrocarbon recovery reservoir, another hydrocarbon recovery reservoir, and any combination thereof.

5. The system of claim 3, wherein the pressure maintenance reservoir is selected from the group consisting of: the first hydrocarbon recovery reservoir, the second hydrocarbon recovery reservoir, another hydrocarbon recovery reservoir, and any combination thereof.

6. The system of claim 2, further comprising a recycle loop configured to direct at least a portion of the compressed gaseous carbon dioxide stream to the combustion unit or the secondary gas stream.

7. The system of claim 1, further comprising a control algorithm configured to control the mixture and combustion of the gaseous control fuel stream, the secondary gas stream comprising carbon dioxide and hydrocarbons, and the oxygen stream to ensure consumption of substantially all of the oxygen in the oxygen stream.

8. The system of claim 7, wherein the combustion unit is selected from the group consisting of: an oxygen combustor, a pre-mix combustor, a piloted combustor, a partial oxidation (POX) combustor, a diffusion burner, an autothermal reformer, and an oxyClaus reaction furnace burner.

9. The system of claim 2, wherein the expander is selected from the group consisting of: an expander in a gas power turbine and a hot gas expander.

10. The system of claim 9, further comprising an inlet compressor configured to compress atmospheric air to form a compressed air stream, wherein the air separation unit is configured to utilize the compressed air stream to form the oxygen stream and the nitrogen stream.

11. The system of claim 10, wherein the expander is the expander in a gas power turbine and the inlet compressor is driven by the gas power turbine and the compressed gaseous carbon dioxide stream is utilized as a working fluid in the expander of the gas power turbine.

12. The system of claim 3, wherein the secondary gas stream comprising carbon dioxide and hydrocarbons comprises from about 60 volume percent carbon dioxide to about 95 volume percent carbon dioxide;
wherein the oxygen stream comprises from about 70 volume percent oxygen to about 100 volume percent oxygen;
wherein the inert gas stream comprising nitrogen comprises from about 70 volume percent nitrogen to about 100 volume percent nitrogen;
wherein the gaseous control fuel stream comprises from about 80 volume percent to about 100 volume percent methane; and
wherein the nitrogen stream comprises from about 85 volume percent nitrogen to about 100 volume percent nitrogen.

13. The system of any one of claims 1-2, wherein at least a portion of the nitrogen stream is sent to a location selected from the group consisting of: a nitrogen storage location, a nitrogen sales location, and a nitrogen venting location.

14. The system of claim 1, further comprising a secondary gas compressor configured to compress the secondary gas stream comprising carbon dioxide and hydrocarbons to form a compressed secondary gas stream prior to feeding at least a portion of the compressed secondary gas stream to the combustion unit.

15. The system of any one of claims 1-2, wherein at least a portion of the compressed gaseous carbon dioxide stream is sent to a location selected from the group consisting of: a carbon dioxide sequestration location, a carbon dioxide sales location, a carbon capture location, a venting location, and any combination thereof.

16. The system of claim 10, further comprising a desalination plant configured to utilize at least a portion of the mechanical power, at least a portion of the steam power, the at least a portion of the heat energy, and at least a portion of the heat generated by the inlet compressor.

17. The system of claim 14, further comprising a cross-exchange heating system configured to transfer at least a portion of the heat generated from a heat source to the compressed secondary gas stream, wherein the heat source is selected from the group consisting of: the carbon dioxide compressor, the heat recovery unit, the gaseous combustion stream, the gaseous exhaust stream, and any combination thereof.

18. The system of claim 2, wherein the gaseous exhaust stream is provided to the heat recovery unit at above atmospheric pressure.

19. The system of claim 1, wherein at least a portion of the system is located on an offshore barge or platform.

20. A method of improved hydrocarbon recovery, comprising:
separating air into an oxygen stream and a nitrogen stream;
providing a gaseous control fuel stream;
combusting in a combustor, at least the gaseous control fuel stream and the high purity oxygen stream to form a gaseous combustion stream having carbon dioxide and water;
receiving the gaseous combustion stream having carbon dioxide and water into a power generation system, wherein the power generation system produces at least a compressed gaseous carbon dioxide stream comprising from about 60 volume percent (vol %) carbon dioxide to about 95 vol % carbon dioxide;
injecting at least a portion of the compressed gaseous carbon dioxide stream into an enhanced oil recovery reservoir; and
injecting at least a portion of the nitrogen stream into a pressure maintenance reservoir,
producing a first hydrocarbon mixture from a first hydrocarbon recovery reservoir;
separating the first hydrocarbon mixture into a first hydrocarbon stream and a secondary gas stream comprising carbon dioxide and hydrocarbons; and
producing the gaseous combustion stream having carbon dioxide and water at the combustion unit utilizing at least a portion of the secondary gas stream with the gaseous control fuel stream and the oxygen stream.

21. The method of claim 20, wherein the method of operating the power generation system comprises:
expanding the gaseous combustion stream in an expander to produce mechanical power and a gaseous exhaust stream;
cooling the gaseous exhaust stream in a heat recovery unit configured to produce heat energy, a cooled gaseous carbon dioxide stream, and a volume of water, wherein the heat energy is optionally utilized to produce steam for generating steam power; and
compressing the cooled gaseous carbon dioxide stream in a carbon dioxide compressor to form the compressed gaseous carbon dioxide stream.

22. The method of claim 21, further comprising:
feeding at least a portion of the secondary gas stream comprising carbon dioxide and hydrocarbons to: 1) the gaseous control fuel stream for mixing or 2) the combustor in the step of combusting the gaseous control fuel stream and the oxygen stream.

23. The method of claim 22, further comprising:
producing a second hydrocarbon mixture from a second hydrocarbon recovery reservoir;
separating the second hydrocarbon mixture into a second hydrocarbon stream and an inert gas stream comprising nitrogen; and
adding the inert gas stream comprising nitrogen to the nitrogen stream for injection into the pressure maintenance reservoir.

24. The method of claim 22, further comprising compressing the secondary gas stream comprising carbon dioxide and hydrocarbons prior to feeding at least a portion of the secondary gas stream to the combustor to form a compressed secondary gas stream.

25. The method of claim 20, further comprising recycling at least a portion of the compressed gaseous carbon dioxide stream to the combustor or the secondary gas stream.

26. The method of claim 21, further comprising providing at least a portion of the volume of water for use as irrigation water or to generate steam.

27. The method of claim 21, wherein the expander is selected from the group consisting of: an expander in a gas power turbine and a hot gas expander.

28. The method of claim 27, further comprising compressing atmospheric air in an inlet compressor; and utilizing, the compressed air in the air separation unit to form the oxygen stream and the nitrogen stream.

29. The method of claim 28, wherein the expander is the expander in a gas power turbine and the inlet compressor is driven by the gas power turbine; and utilizing the compressed gaseous carbon dioxide stream as a working fluid in the gas power turbine.

30. The method of claim 23, wherein the secondary gas stream comprising carbon dioxide comprises from about 60 volume percent carbon dioxide to about 95 volume percent carbon dioxide; wherein the oxygen stream comprises from about 70 volume percent oxygen to about 100 volume percent oxygen; wherein the inert gas stream comprising nitrogen comprises from about 70 volume percent nitrogen to about 100 volume percent nitrogen; wherein the gaseous control fuel stream comprises from about 80 volume percent to about 100 volume percent methane; and wherein the nitrogen stream comprises from about 85 volume percent nitrogen to about 100 volume percent nitrogen.

31. The method of claim 22, wherein the enhanced oil recovery reservoir is selected from the group consisting of: the first hydrocarbon recovery reservoir, the second hydrocarbon recovery reservoir, another hydrocarbon recovery reservoir, and any combination thereof.

32. The method of claim 23, wherein the pressure maintenance reservoir is selected from the group consisting of: the second hydrocarbon recovery reservoir, the first hydrocarbon recovery reservoir, another hydrocarbon recovery reservoir, and any combination thereof.

33. The method of claim 24, further comprising heating at least a portion of the compressed secondary gas stream utilizing a heat source selected from the group consisting of: heat generated by compressing the cooled gaseous carbon dioxide stream, heat generated by compressing atmospheric air, heat from the gaseous combustion stream having carbon dioxide and water, heat from the gaseous exhaust stream, the heat energy, and any combination thereof.

34. The method of claim 28, further comprising heating at least a portion of the compressed secondary gas stream utilizing a heat source selected from the group consisting of: heat generated by compressing the cooled gaseous carbon dioxide stream, heat generated by compressing atmospheric air, heat from the gaseous combustion stream having carbon dioxide and water, heat from the gaseous exhaust stream, the heat energy, and any combination thereof.

35. The method of claim 22, further comprising controlling the mixing and combustion of the gaseous control fuel stream, the secondary gas stream comprising carbon dioxide and hydrocarbons, and the oxygen stream to ensure consumption of substantially all of the oxygen in the oxygen stream.

36. The method of claim 35, wherein the combustor is selected from the group consisting of: an oxygen combustor, a pre-mix combustor, a piloted combustor, a partial oxidation (POX) combustor, a diffusion burner, an autothermal reformer, and an oxyClaus reaction furnace burner.

37. The method of claim 21, further comprising desalinating water in a desalination plant, wherein the desalination plant utilizes at least one of the of mechanical power, the heat energy, the steam power, heat generated by compressing the cooled gaseous carbon dioxide stream, heat from the gaseous combustion stream having carbon dioxide and water, heat from the gaseous exhaust stream, and any combination thereof.

38. The method of claim 21, wherein the gaseous exhaust stream is provided to the heat recovery unit at above atmospheric pressure.

39. The method of claim 20, further comprising sending at least a portion of the compressed gaseous carbon dioxide stream to a location selected from the group consisting of: a carbon dioxide sequestration location, a carbon dioxide sales location, a carbon capture location, and any combination thereof; and sending at least a portion of the nitrogen stream to a nitrogen storage location.

* * * * *